United States Patent
Kaga et al.

(10) Patent No.: US 9,499,703 B2
(45) Date of Patent: Nov. 22, 2016

(54) INK-JET IMAGE FORMING METHOD AND INK-JET INK SET

(75) Inventors: Makoto Kaga, Hachioji (JP); Akio Maeda, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 334 days.

(21) Appl. No.: 13/511,819

(22) PCT Filed: Sep. 13, 2010

(86) PCT No.: PCT/JP2010/065706
§ 371 (c)(1),
(2), (4) Date: Aug. 14, 2012

(87) PCT Pub. No.: WO2011/065095
PCT Pub. Date: Jun. 3, 2011

(65) Prior Publication Data
US 2013/0044168 A1 Feb. 21, 2013

(30) Foreign Application Priority Data
Nov. 30, 2009 (JP) ................................ 2009-271197

(51) Int. Cl.
*C09D 11/101* (2014.01)
*B41M 5/00* (2006.01)
(Continued)

(52) U.S. Cl.
CPC .......... *C09D 11/101* (2013.01); *B41M 5/0023* (2013.01); *C09D 11/12* (2013.01);
(Continued)

(58) Field of Classification Search
CPC ....................................................... B41J 2/14
(Continued)

(56) References Cited

U.S. PATENT DOCUMENTS 6,790,875 B2 * 9/2004 Noguchi et al. ................ 522/84
6,966,643 B2 * 11/2005 Hale et al. ...................... 347/88
(Continued)

FOREIGN PATENT DOCUMENTS

EP 2138900 A1 12/2009
JP 2003-39645 A 2/2003
(Continued)

OTHER PUBLICATIONS

International Search Report for International Application No. PCT/JP2010/065706, mailed Nov. 16, 2010, with English translation.
(Continued)

*Primary Examiner* — Stephen Meier
*Assistant Examiner* — Renee I Wilson
(74) *Attorney, Agent, or Firm* — Cantor Colburn LLP

(57) ABSTRACT

In the present invention, provided are an ink-jet image forming method employing actinic energy radiation curable ink-jet ink exhibiting no offset resistance during storage by superposing printed portions after printing in addition to excellent properties of printing durability, gloss evenness of coated paper and paper-feeding suitability, and an ink-jet ink set thereof. It is a feature that the ink-jet image forming method possessing the steps of providing colorless ink on a substrate, followed by heating the colorless ink provided on the substrate, and subsequently exposing the colorless ink provided on the substrate, to actinic energy radiation, wherein the colorless ink contains no colorant but an actinic energy radiation curable composition and a gelling agent with which a thermoreversible gel is formed.

12 Claims, 1 Drawing Sheet

(51) Int. Cl.
*C09D 11/12* (2006.01)
*C09D 11/40* (2014.01)
*B41M 7/00* (2006.01)

(52) U.S. Cl.
CPC ............... *C09D 11/40* (2013.01); *B41M 7/009* (2013.01); *B41M 7/0081* (2013.01)

(58) Field of Classification Search
USPC .................................................... 347/102, 52
See application file for complete search history.

(56) References Cited

U.S. PATENT DOCUMENTS

| | | | | |
|---|---|---|---|---|
| 8,480,203 | B2* | 7/2013 | Van Thillo et al. | 347/21 |
| 8,511,811 | B2* | 8/2013 | Kakino et al. | 347/100 |
| 2002/0149659 | A1* | 10/2002 | Wu et al. | 347/102 |
| 2007/0058020 | A1* | 3/2007 | Wetjens | C09D 11/101 347/102 |
| 2007/0120908 | A1* | 5/2007 | Odell et al. | 347/88 |
| 2007/0120922 | A1* | 5/2007 | Belelie | C09D 11/101 347/100 |
| 2007/0142492 | A1* | 6/2007 | Odell | C09D 11/101 522/74 |
| 2007/0211110 | A1* | 9/2007 | Iftime et al. | 347/52 |
| 2008/0090928 | A1 | 4/2008 | Iftime et al. | |
| 2011/0057985 | A1* | 3/2011 | Kakino et al. | 347/21 |

FOREIGN PATENT DOCUMENTS

| | | |
|---|---|---|
| JP | 2005-126507 A | 5/2005 |
| JP | 2007-154188 A | 6/2007 |
| JP | 2009-510184 A | 3/2009 |
| JP | 2010-792 A | 1/2010 |

OTHER PUBLICATIONS

Extended European Search Report for Application No. 10832942.6-1701/2508349, dated Jan. 21, 2014.

* cited by examiner

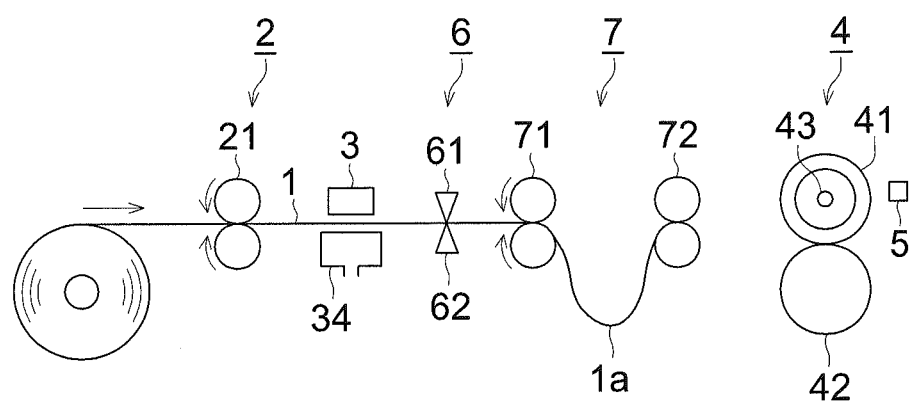

INK-JET IMAGE FORMING METHOD AND INK-JET INK SET

CROSS REFERENCE TO RELATED APPLICATIONS

This is a U.S. national stage of application No. PCT/JP2010/065706, filed on 13 Sep. 2010. Priority under 35 U.S.C. §119(a) and 35 U.S.C. §365(b) is claimed from Japanese Application No. 2009-271197, filed 30 Nov. 2009, the disclosure of which are also incorporated herein by reference.

TECHNICAL FIELD

The present invention relates to a method to form an image onto a substrate employing an actinic energy radiation curable ink-jet ink set, and further relates to an ink-jet image forming method employing actinic energy radiation ink-jet ink exhibiting excellent properties of printing durability, print-through resistance of plain paper, gloss evenness of coated paper and paper-feeding suitability, and no offset resistance during storage by superposing printed portions after printing, and an ink-jet ink set thereof.

BACKGROUND

As to an ink-jet image forming method, high-resolution images are possible to be recorded by a relatively simple apparatus, and the ink-jet image forming method has been rapidly in progress in various fields. There are a wide range of applications to use the ink-jet image forming method, and a recording medium or ink suitable for each purpose is employed. Specifically, in recent years, recording speed has been largely increased, and printers each having convenience printing-strength properties have been developed.

In the case of this ink-jet recording system, ink is ejected from an ink-jet head, and deposited onto a recording medium to form images. The ink should exhibit a condition of low viscosity in order to eject the ink from the ink-jet head. On the other hand, high viscosity ink is demanded in order to prevent color mixing called bleed generated when plural kinds of liquid-droplet ink each exhibiting different hue are deposited on the recording medium.

As a method of solve this dilemma, a UV radiation curable type ink-jet recording method employing actinic energy radiation curable ink is practically utilized. This is a technique by which an actinic energy radiation curable monomer and a photo-initiator are contained in ink, and the resulting one is exposed to actinic energy radiation, for example, UV radiation after depositing it onto a recording medium to cure the ink, resulting in achievement of a good balance between acquisition of an ejection property and prevention of bleed.

On the other hand, as a technique to suppress bleed, there is an image forming method employing so-called hot-melt ink wherein the hot-melt ink is present at ambient temperature as a solid phase, but is present at a high operation temperature of an ink-jet printing apparatus as a liquid phase (refer to Patent Document 1, for example).

In the case of this hot-melt ink system, when depositing ink-droplets on the surface of a recording material, they are rapidly solidified with no expansion of the recording material in the direction of the area, whereby high resolution images can be formed. Since actinic energy radiation curable ink as well as hot-melt ink does not contain a solvent in an ink component, it is advantageous that images can be formed on a recording material exhibiting no ink absorption. In addition, disclosed is a technique by which a gelation action-producing material is contained in an actinic energy radiation curable ink component via temperature change in order to improve dot gain and glossiness, and images are formed via the temperature change and exposure to actinic energy radiation after ink ejected from an ink head is deposited on a recording material.

Though the inventors surely confirmed that a certain amount of an improving effect to the dot gain and the glossiness was observed via application of the above-described technique, it was found out that the improving effect was insufficient, resulting in insufficient characteristics to printing durability, print-through resistance, paper-feeding suitability and offset resistance.

PRIOR ART DOCUMENT

Patent Document

Patent Document 1: Japanese Document O.P.I. (Open to Public Inspection) Publication No. 2007-154188
Patent Document 2: Japanese Document O.P.I. Publication No. 2009-510184
Patent Document 3: Japanese Document O.P.I. Publication No. 2005-126507

DISCLOSURE OF THE INVENTION

Problems to be Solved by the Invention

The present invention was made on the basis of the above-described problems, and it is an object of the present invention to provide an ink-jet image forming method employing actinic energy radiation curable ink-jet ink exhibiting no offset resistance during storage by superposing printed portions after printing in addition to excellent properties of printing durability, gloss evenness of coated paper and paper-feeding suitability, and an ink-jet ink set thereof.

Means to Solve the Problems

The above-described object of the present invention is achieved by the following structures.

(Structure 1) An ink-jet image forming method comprising the steps of providing colorless ink on a substrate, followed by heating the colorless ink provided on the substrate, and subsequently exposing the colorless ink provided on the substrate, to actinic energy radiation, wherein the colorless ink contains no colorant but an actinic energy radiation curable composition and a gelling agent with which a thermoreversible gel is formed.

(Structure 2) The ink-jet image forming method of Structure 1, comprising the steps of providing the colorless ink on the substrate, followed by heating the colorless ink provided on the substrate at a temperature of at least 10° C. higher than a melting temperature of the gelling agent, and subsequently exposing the colorless ink provided on the substrate, to the actinic energy radiation.

(Structure 3) An ink-jet ink set comprising (1) chromatic ink containing an actinic energy radiation curable composition, a gelling agent with which a thermoreversible gel is formed, and a colorant; and (2) colorless ink containing no colorant but the actinic energy radiation curable composition and the gelling agent with which the thermoreversible gel is formed.

(Structure 4) The ink-jet ink set of Structure 3, wherein the actinic energy radiation curable composition contained by each of the chromatic ink and the colorless ink comprises a radically polymerizable compound.

(Structure 5) The ink-jet ink set of Structure 3, wherein the actinic energy radiation curable composition contained by each of the chromatic ink and the colorless ink comprises a cationically polymerizable compound.

(Structure 6) An ink-jet image forming method employing the ink-jet ink set of any one of structures 3-5, comprising the steps of providing (1) chromatic ink containing an actinic energy radiation curable composition, a gelling agent with which a thermoreversible gel is formed, and a colorant, on an image forming region; subsequently providing (2) colorless ink containing no colorant but the actinic energy radiation curable composition and the gelling agent with which the thermoreversible gel is formed, on an entire surface of the image forming region, followed by heating applied thereto; and subsequently exposing the resulting comprising (2) and (1) to actinic energy radiation.

According to studies done by the inventors, it is found out that when utilizing an ink-jet image forming method comprising the steps of providing colorless ink on a substrate, followed by heating the colorless ink provided on the substrate, and subsequently exposing the colorless ink provided on the substrate, to actinic energy radiation, wherein the colorless ink contains no colorant but an actinic energy radiation curable composition and a gelling agent with which a thermoreversible gel is formed, or an ink-jet ink set comprising (1) chromatic ink containing an actinic energy radiation curable composition, a gelling agent with which a thermoreversible gel is formed, and a colorant; and (2) colorless ink containing no colorant but the actinic energy radiation curable composition and the gelling agent with which the thermoreversible gel is formed, difference in height between a non-printed portion and a printed portion is minimized to reduce difference in gloss between them; to enhance gloss evenness; and to improve printing durability, and further, conveyance of a recording medium to be continuously printed is improved, and trouble during conveyance after printing can be reduced by minimizing the difference in height.

Effect of the Invention

An ink-jet image forming method employing actinic energy radiation curable ink-jet ink exhibiting no offset resistance during storage by superposing printed portions after printing in addition to excellent properties of printing durability, gloss evenness of coated paper and paper-feeding suitability, and an ink-jet ink set thereof were able to be provided via the present invention.

BRIEF DESCRIPTION OF THE DRAWINGS

FIG. 1 is a schematic flow diagram showing an example of the step flow of an ink-jet recording apparatus used for an ink-jet image forming method of the present invention.

DESCRIPTION OF THE PREFERRED
EMBODIMENTS

Next, embodiments to realize the present invention will be described in detail, but the present invention is not limited thereto.

After considerable effort during intensive studies on the basis of the above-described problems, the inventors have found out that an ink-jet image forming method employing actinic energy radiation curable ink exhibiting excellent offset resistance when superposing printing portions after printing to store them, together with excellent properties of printing durability, print-through resistance of plain paper, gloss evenness of coated paper and paper-feeding suitability, and an ink-jet ink set thereof are realized by utilizing an ink-jet image forming method comprising the steps of providing colorless ink on a substrate, followed by heating the colorless ink provided on the substrate, and subsequently exposing the colorless ink provided on the substrate, to actinic energy radiation, wherein the colorless ink contains no colorant but an actinic energy radiation curable composition and a gelling agent with which a thermoreversible gel is formed, or an ink-jet ink set comprising (1) chromatic ink containing an actinic energy radiation curable composition, a gelling agent with which a thermoreversible gel is formed, and a colorant; and (2) colorless ink containing no colorant but the actinic energy radiation curable composition and the gelling agent with which the thermoreversible gel is formed; and the inventors have reached the present invention.

The reason to be detailed to solve the above-described problems by utilizing the present invention is presumably as follows.

When only providing colorless ink consisting of an actinic energy radiation curable composition on the image surface, since dots of deposited ink are expanded in the two-dimensional direction because of low ink viscosity during deposition of the colorless ink onto a substrate, or in the case of an absorptive substrate, the image surface can not be effectively coated because of penetration thereof into the substrate, deposited chromatic ink dots are easy to be peeled, resulting in appearance of a problem in image durability. In contrast, colorless ink having been deposited is not diffused beyond necessity, and the applied colorless ink is provided at the predetermined position by adding a gelling agent in the colorless ink. However, since gelation is caused by rappid temperature drop after depositing the colorless ink containing the gelling agent, this time on the contrary, dots having been deposited do not expand to the predetermined size, and variation in dot height of the colorless ink in the height direction with respect to a substrate has been produced. For this reason, variations in image durability and evenness are produced, resulting in appearance of an undesirable situation.

In contrast, it was newly confirmed that when after depositing the colorless ink, heating was applied before exposure to actinic energy radiation, the dot having been deposited once for gelation was dissolved again, and the neighborhood of the formed dot surface was dissolved to uniformize the dot height formed from clear ink dot liquid droplets, whereby image durability and evenness were improved.

That is, at the stage where ink liquid droplets are deposited on a recording medium such as plain paper or the like when using a gelling agent, solidification of the ink liquid droplets is completed in a very short period of time, and as a result, diffusion of the ink liquid droplet component and print-through during use of the plain paper can be effectively avoided. However, since strength of the formed image film is insufficient only in the case of phase-change via use of a gelling agent (sol→gel), images each exhibiting improved printing durability can be obtained by curing an actinic radiation curable composite contained in ink at the same time via exposure to actinic energy radiation, UV rays or the like. However, the difference in height between the printing portion and the non-printing portion caused by elevation of the deposited from a substrate is grown to a large difference since ink liquid droplets having been deposited are rapidly solidified. For this reason, it is made clear via studies done by the inventors that difference in gloss between the printing portion and the non-printing portion has become highly visible, and gloss evenness and paper-transportability during continuous printing have been degraded. In contrast, the above-described problems can be overcome by using chromatic ink and colorless ink in combination.

Next, constituent elements each used in an ink-jet image forming method of the present invention are described in detail.

<<Gelling Agent with which Thermo-Irreversible Gel is Formed>>

Gel of the present invention has a structure in which solute having lost independent mobility is collected via interaction of a lamella structure, a covalent-bonded or hydrogen-bonded polymeric mesh, polymeric mesh formed by physical coagulation, or a structure in which particles are coagulated, and is referred to as a state of solidification or semi-solidification via rapid increase of viscosity or large increase of elasticity.

A gelling agent of the present invention is referred to as a compound capable of forming the foregoing gel when the gelling agent is added into another compound. The gelling agent is a compound capable of forming the foregoing gel, when the gelling agent is added into a compound other than water.

Gel is generally classified into a thermoreversible gel which becomes a solution exhibiting fluidity via heating and returns to an original gel via cooling, and a thermo-irreversible gel which does not return to a solution even though heating is applied once gelation has been completed.

The phase transition temperature used in the present invention means a temperature at which viscosity rapidly changes from a fluid solution state to a gel state, and is synonymous with a term called a gel transition temperature, a gel solubility temperature, a gelling temperature, a sol-gel transition temperature or a gel point. In addition, the melting temperature used in the present invention means a temperature at which a gelling agent in a gelation state starts to melt.

The actinic energy radiation curable ink of the present invention (hereinafter, also referred to simply as ink, and the ink of the present invention means chromatic ink or colorless ink unless otherwise specifically mentioned) preferably has an ink phase transition temperature of not less than 40° C. and not more than 130° C. In the case of an ink phase transition temperature of 40° C. or more, when liquid droplets are injected from a recording head (hereinafter, "injection" is also called "ejection") the ejection can be stably performed with no influence of printing environment temperature, and further, in the case of an ink phase transition temperature of 150° C. or less, an ink-jet recording apparatus is not required to be subjected to heating at excessively high temperature, whereby load to a head and an ink supply system member in the ink-jet recording apparatus can be reduced.

As to the method of measuring a phase transition temperature of ink, for example, provided are a method in which a phase transition point is set at a time when a small iron piece trapped in a glass tube is placed in a dilatometer, and does not fall freely in ink liquid with respect to temperature change {J. Polym. Sci., 21, 57 (1956)}, and a method in which the temperature at which an aluminum cylinder falls freely at a time when the aluminum cylinder is placed on ink and a gel temperature is changed is measured as a phase transition temperature {Journal of the Society of Rheology Vol. 17, 86 (1989)}. Further, through a simple method, a test piece in the form of gel is placed on a heat-plate, and the heat-plate is heated to measure a temperature at which shape of the test piece is broken, whereby this temperature can be determined as a sol-gel phase transition temperature.

Further, as a gel structure, a gelling agent itself is preferably a compound capable of forming a fiber-like association body as a gel structure. Formation of the fiber-like association body can be easily observed via shape observation by a transmission electron microscope.

Next, specific examples of the gelling agent usable for ink of the present invention are shown, but the present invention is not limited only to these compounds.

Examples of compounds each preferably used as a gelling agent of the present invention include polyethylene wax, polypropylene wax, polystyrene wax, stearone, stearic acid, glycerin monostearate, glycerin monolaurate, glycerin mono 12-hydroxystearate, an octadocosanoic acid, monoglyceride, stearyl stearate, stearyl alcohol, a behenic acid, lipophilic smectite, a rosin-based oil gelling agent, behenyl alcohol, glyceryl behenate, inulin stearate, dextrin palmitate, N,N-methylenebisoctadecanamide, N-stearylstearic acid amide, oleylpalmitic acid amide, dextrin palmitate, N-lauroyl-L-dibutylglutaminamide, N-2ethylhexanoyl-L-dibutylglutaminamide, 1,3:2,4-bis-O-benzylidene-D-glucitol (dibenzylidene sorbitol), 1,3:2,4-bis-O-(4-methylbenzylidene)-D-sorbitol, straight-chain alcohol, a straight-chain carboxylic acid, a urethane resin, compounds represented by the following compounds OG-1, OG-2, OG-3, OG-4, OG-5, OG-6, OG-7, OG-8, OG-9, OG-10, OG-11, OG-12, OG-13, OG-14 and OG-15, and so forth.

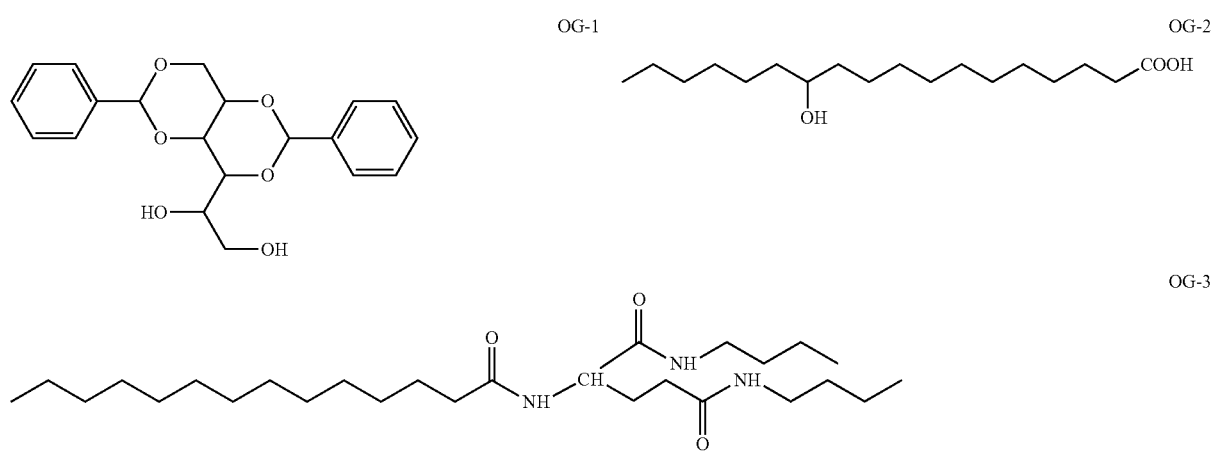

-continued
OG-4
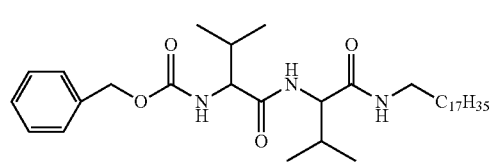
OG-5
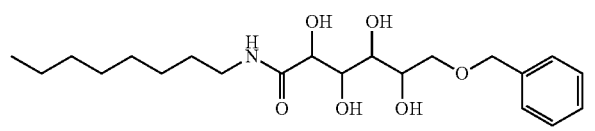
$F(CF_2)_n(CH_2)_mH$
OG-6
OG-7
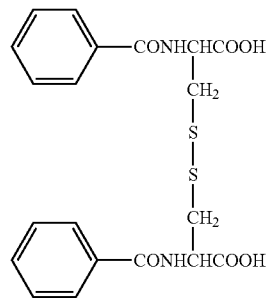
OG-8
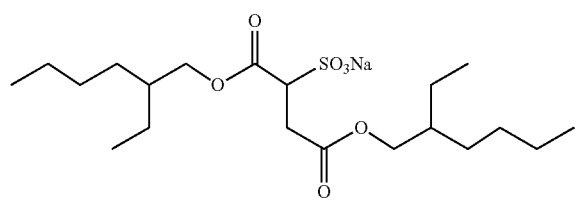
OG-9
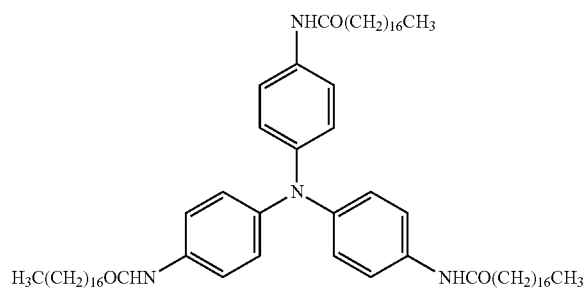
OG-10
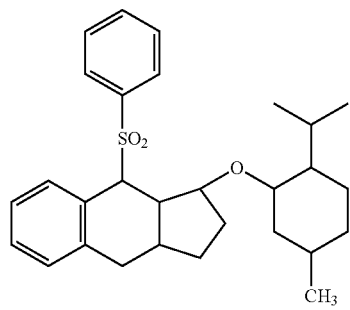
OG-11
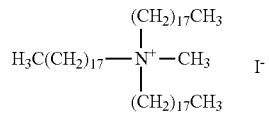
OG-12
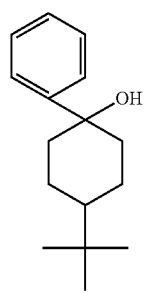
OG-13
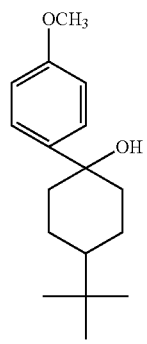

OG-14

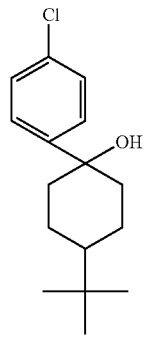

OG-15

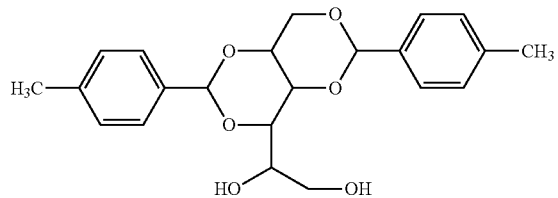

The gelling agent to be used has a content of 0.1-30% by weight; preferably has a content of 0.3-15% by weight; and more preferably has a content of 3-15% by weight, based on ink of the present invention. Further, a stable ejection property can be obtained by making the content of the gelling agent to fall within the foregoing range.

The ink of the present invention, containing the above-described gelling agent preferably has an ink viscosity of 1-15 mPa·s, and more preferably has an ink viscosity of 1-10 mPa·s at a temperature of +5° as phase transition temperature of ink. In the case of the above-described range, a stable ejection property can be further obtained, and the effect and objective of the present invention can be further realized.

<<Actinic Energy Radiation Curable Composition>>

As examples of constituent components in an actinic energy radiation curable composition, exemplified are an actinic energy radiation polymerizable compound, an actinic energy radiation polymerization initiator and so forth. Next, these will be specifically explained.

[Actinic Energy Radiation Polymerizable Compound]

The actinic energy radiation polymerizable compound is preferably selected from a radically polymerizable compound and a cationically polymerizable compound.

In the case of the radically polymerizable compound, known are an actinic energy radiation curable type material obtained by using an actinic energy radiation polymerizable composition and a cationic polymerization type actinic energy radiation curable resin described in Japanese Patent O.P.I. Publication No. 7-159983, Japanese Patent Examined Publication No. 7-31399, Japanese Patent O.P.I. Publication No. 8-224982 and Japanese Patent O.P.I. Publication No. 10-863, and a photo-cationic polymerization type actinic energy radiation curable resin sensitized in a longer wavelength range than that of visible is recently disclosed in Japanese Patent O.P.I. Publication No. 6-43633, Japanese Patent O.P.I. Publication No. 8-324137 and so forth.

The radically polymerizable compound is a compound having a radically polymerizable ethylenically-unsaturated bond, and any compound is allowed as long as the compound is one having at least one radically polymerizable ethylenically-unsaturated bond in the molecule. The compound includes a monomer, an oligomer, a polymer and so forth. The radically polymerizable monomer may be used singly, or may be used in combination with at least 2 kinds at an arbitrary ratio to improve the intended properties.

Examples of the compound having a radically polymerizable ethylenically-unsaturated bond include unsaturated acids and salts thereof such as an acrylic acid, a methacrylic acid, an itaconic acid, a crotonic acid, an isocrotonic acid, a maleic acid and so forth; esters; urethanes; amides and anhydrides thereof; acrylonitrile; styrene, and further, various kinds of radically polymerizable compounds such as unsaturated polyester, unsaturated polyether, unsaturated polyamide and unsaturated urethane.

Specific examples thereof include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, epoxy acrylate and so forth; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, 2,2-bis (4-methacryloxypolyethoxyphenyl)propane and so forth; and in addition, allyl compound derivatives such as allyl glycidyl ether, diallyl phthalate, triallyl trimellitate and so forth. Further, usable are radically polymerizable and cross-linkable monomers, oligomers and polymers known in the industry or commercially available products described in "Handbook of Crosslinking Agents" edited by Shinzo Yamashita (published by Taisei Sha in 1981); "UV•EB curing Handbook (Raw material edition)" edited by Kiyoshi Kato (published by Kohbunshi Kanko Kai in 1985); "Application and Market of UV•EB Curing Technology" edited by Rad Tech Japan, page 79 (published by CMC in 1989); "Handbook of Polyester Resins" written by Eiichiro Takiyama (published by Nikkan Kogyo Shimbun Ltd. in 1988), and so forth.

The addition amount of the above-described radically polymerizable compound is preferably 1-97% by weight, and more preferably 30-95% by weight with respect to ink.

Examples of radical polymerization initiators include triazine derivatives described in Japanese Patent Examined Publication No. 59-1281, Japanese Patent Examined Publication No. 61-9621 and Japanese Patent O.P.I. Publication No. 60-60104; organic peroxides described in Japanese Patent O.P.I. Publication No. 59-1504 and Japanese Patent O.P.I. Publication No. 61-243807; diazonium compounds described in Japanese Patent Examined Publication No. 43-23684, Japanese Patent Examined Publication No. 44-6413, Japanese Patent Examined Publication No. 44-6413, and 47-1604, and U.S. Pat. No. 3,567,453; organic azide compounds described in U.S. Pat. Nos. 2,848,328, 2,852,379 and 2,940,853; ortho-quinonediazides described in Japanese Patent Examined Publication No. 36-22062, Japanese Patent Examined Publication No. 37-13109, Japanese Patent Examined Publication No. 38-18015 and Japanese Patent Examined Publication No. 45-9610; various kinds of onium compounds described in Japanese Patent Examined Publication No. 55-39162, Japanese Patent O.P.I. Publication No. 59-14023 and "Macromolecules," Vol. 10, page 1307 (1977); azo compounds described in Japanese Patent O.P.I. Publication No. 59-142205; metal allene complexes described in Japanese Patent O.P.I. Publication No. 1-54440, European Patent No. 109,851, European Patent No. 126,712 and "J. Imag. Sci.," Vol. 30, page 174 (1986); (oxo)sulfonium organic boron complexes described in Japanese Patent No. 4-213861 and Japanese Patent No. 4-255347; titanocenes described in Japanese Patent O.P.I. Publication No. 61-151197; transition metal complexes each containing a transition metal such as ruthenium described in "Coordination Chemistry Review," Vol. 84, pages 85-277 (1988) and Japanese Patent Publication No. 2-182701; 2,4, 5-triarylimidazole dimers and carbon tetrabromide described in Japanese Patent O.P.I. Publication No. 3-209477; organic halogen compounds described in Japanese Patent O.P.I. Publication No. 59-107344, and so forth. Any of these radical polymerization initiators preferably has a content of 0.01-10% by weight, based on 100% by weight of a compound having a radically polymerizable ethylenically-unsaturated bond.

Subsequently, a cationically polymerizable compound will be described.

Examples of the cationically polymerizable compound include vinyl ether compounds, epoxy compounds, oxetane compounds and cyclic compounds in addition to the foregoing compounds. Next, these will be specifically described.
[Epoxy Compound]

Any of monomers, oligomers and polymers used as an epoxy resin is conventionally usable for an epoxy compound. Specific examples thereof include commonly known aromatic epoxide, alicyclic epoxide and aliphatic epoxide. In addition, the epoxide means a monomer or an oligomer thereof. These compounds may be used singly or in combination with at least 2 kinds thereof.

The aromatic epoxide is preferably di- or polyglycidyl ether prepared via reaction of a polyphenol having at least one aromatic nucleus or an alkylene oxide adduct thereof with epichlorohydrin, and examples thereof include di- or polyglycidyl ether of bisphenol A or an alkylene oxide adduct thereof; di- or polyglycidyl ether of hydrogenated bisphenol A or an alkylene oxide adduct thereof; a novolactype epoxy resin; and so forth. Herein, as the alkylene oxide, ethylene oxide, propylene oxide or the like can be cited.

The alicyclic epoxide is preferably a compound containing cyclohexene oxide or cyclopentene oxide obtained by epoxidizing a compound having at least one cycloalkane ring such as a cyclohexene or cyclopentene ring with a suitable oxidant such as hydrogen peroxide, a peracid or the like. Specific examples thereof include Celloxide 2021, Celloxide 2021A, Celloxide 2021P, Celloxide 2080, Celloxide 2000, Epolead GT301, Epolead GT302, Epolead GT401, Epolead GT403, EHPE-3150 and EHPEL 3150CE (produced by Daicel Chemical Industries, Ltd.); and UVR-6105, UVR-6110, UVR-6128, UVR-6100, UVR-6216 and UVR-6000 (produced by Union Carbide Corp.).

The aliphatic epoxide is preferably di or polyglycidyl ether of aliphatic polyhydric alcohol or an alkylene oxide adduct thereof and typical examples thereof include diglycidyl ether of alkylene glycol such as ethylene glycol diglycidyl ether, propylene glycol diglycidyl ether, 1,6-hexane diol diglycidyl ether or the like; polyglycidyl ether of polyhydric alcohol such as di- or triglycidyl ether of glycerin or an alkylene oxide adduct thereof and diglycidyl ether of polyalkylene glycol such as diglycidyl ether of polyethylene glycol or an alkylene oxide adduct thereof diglycidyl ether of polypropylene glycol or an alkylene oxide adduct thereof or the like, and so forth. Herein, as the alkylene oxide, ethylene oxide, propylene oxide or the like can be cited.

Further, in addition to these compounds, usable are monoglycidyl ether of higher aliphatic alcohol, monoglycidyl ether of phenol or cresol, and so forth. Of these epoxides, aromatic epoxide and alicyclic epoxide are preferable in consideration of rapid curability, and the alicyclic epoxide is specifically preferable.

Any of these epoxy compounds is preferably blended in a component in the form of liquid, which is composed of an oxetane compound and a vinyl ether compound in an amount of 0-20% by weight, and preferably 0-10% from the viewpoint of curability, flexibility of a curing film, and adhesion to a substrate.
[Oxetane Compound]

An oxetane compound is a compound having at least one oxetane (trimethylene oxide) ring in the molecule. Specifically, preferably usable examples thereof include 3-ethyl-3-hydroxymethyloxetane (OXT101, produced by Toagosei Co., Ltd.), 1,4-bis[(3-ethyl-3-oxetanyl)methoxymethyl]benzene (OXT121, produced by Toagosei Co. Ltd.), 3-ethyl-3-(phenoxymethyl)oxetane (OXT211, produced by Toagosei Co. Ltd.), di(1-ethyl-3-oxetanyl)methyl ether (OXT221, produced by Toagosei Co. Ltd.), 3-ethyl-3-(2-ethylhexyloxymethyl)oxetane (OXT212, produced by Toagosei Co. Ltd.), di(1-methyl-3-oxetanyl)methyl ether, and so forth. Specifically preferable are 3-ethyl-3-hydroxymethloxetane, 3-ethyl-3-(phenoxymethyl)oxetane, and di(1-ethyl-3-oxetanyl)methyl ether. These can be used singly or in combination with at least 2 kinds thereof. Any of these oxetane compounds is preferably blended in a component in the form of liquid, which is composed of an epoxy compound, an oxetane ring-containing compound and a vinyl ether compound in an amount of 0-20% by weight, and preferably 0-10% from the viewpoint of curability, flexibility of a curing film, and adhesion to a substrate.
[Vinyl Ether Compound]

A vinyl ether compound is usable as a cationically polymerizable compound employed in the present invention. In general, as to vinyl ether, a vinyl group in the molecule is changed to a vinyl cation with an acid produced by actinic energy radiation.

In this case, when there are less ester bonding and less ether bonding at the other portion in the molecule, a polymer having a considerably low polymerization degree is only obtained since a great deal of polymerization is immediately generated. On the other hand, when a mono, di or triethylene oxide chain is introduced in the molecule, those having a high molecular height are produced since reaction speed can be appropriately adjusted, whereby film properties such as adhesion, flexibility and so forth are improved. For this reason, the above-described compound is preferably applied thereto.

The vinyl ether compound means an organic compound having a vinyl ether group, and is a compound preferably having a molecular weight of 100-2000 and more preferably having a molecular weight of 200-1200.

Excellent wear resistance and appropriate density of a polymerization group appear in the above-described molecular weight range, and flexible images can be formed at high speed via an ink-jet technique, since a polymerization group and another polymerization group are separated at a sufficient distance. Specifically, the following compounds are suitably usable.

(Monovalent Monovinyl Ether)

Butyl vinyl ether, hexyl vinyl ether, ethylhexyl vinyl ether, phenyl vinyl ether, benzyl vinyl ether, ethylethoxy vinyl ether, acetylethoxyethoxy vinyl ether, cyclohexyl vinyl ether, and adamantyl vinyl ether (Divalent Divinyl Ether)

Ethylene glycol divinyl ether, diethylene glycol divinyl ether, triethylene glycol divinyl ether, propylene glycol divinyl ether, dipropylene glycol vinyl ether, butylene divinyl ether, dibutylene glycol divinyl ether, neopentyl glycol divinyl ether, cyclohexane diol divinyl ether, cyclohexane dimethanol divinyl ether, norbornyl dimethanol divinyl ether, isovinyl divinyl ether, divinyl resorcin, and divinyl hydroquinone (Trivalent Trivinyl Ether)

Glycerin trivinyl ether, glycerin ethylene oxide adduct trivinyl ether (the number of moles added by ethylene oxide is 6), trimethylol propane trivinyl ether, and trivinyl ether ethylene oxide adduct trivinyl ether (the number of moles added by ethylene oxide is 6)

(Tetravalent Tetravinyl Ether)

Pentaerythritol trivinyl ether, and Pentaerythritol ethylene oxide adduct trivinyl ether (the number of moles added by ethylene oxide is 9)

(Hexavalent Hexavinyl Ether)

Ditrimethylol propane hexavinyl ether, and ditrimethylol propane ethylene oxide adduct hexavinyl ether (the number of moles added by ethylene oxide is 6)

Of the above-described vinyl ethers, specifically preferable is vinyl ether having at least divalence. When using vinyl ether having at least divalence, polymerization reaction with acid is accelerated, whereby actinic energy radiation curable sensitivity becomes high, and this is preferable.

Since a vinyl ether monomer exhibits considerably low viscosity, viscosity can be adjusted via addition of a vinyl ether oligomer. Specifically, provided are those commercially available as the product name called VECTOMER (a divinyl ether resin, produced by Allied Signal) such as VECTOMER 2010, VECTOMER 2020, VECTOMER 4010 and VECTOMER 4020; equivalent products available from other manufacturers; and a mixture thereof. A mixture of at least one vinyl ether resin and/or at least one epoxy resin (arbitrary ratio) is also usable. A polyhydroxy functional material {for example, one described in the specification of U.S. Pat. No. 5,856,373 (Kaisaki et al.)} can be also used in combination with an epoxy and/or vinyl ether functional material.

In addition, a commonly known cationically polymerizable cyclic compound other than an epoxy compound, an oxetane compound and a vinyl ether compound may be also contained as a cationically polymerizable compound.

<<Actinic Energy Radiation Polymerization Initiator>>

A commonly known actinic energy radiation acid generator can be used as an actinic energy radiation polymerization initiator usable for ink of the present invention. Specific examples thereof include aryl sulfonium salt derivatives (Silacure UVI-6990 and Silacure UVI-6974, produced by Union Carbide Corp.; Adekaoptomer SP-150, Adekaoptomer SP-152, Adekaoptomer SP-170, and Adekaoptomer SP-172, produced by ADEKA Corporation; CPI-100, CPI-110P, and CPI-110A produced by San Apro Ltd.; TS-91 produced by Sanwa Chemical Co., Ltd.; and Esacure 1187, Esacure 1188 produced by Lamberti Co.); allyl iodonium salt derivatives (RP-2074 produced by Rodia Co., Irgacure 250 and so forth, produced by BASF Japan Ltd.); Arene-ion complex derivatives (Irgacure 250 and so forth, produced by BASF Japan Ltd.); diazonium salt derivatives; triazine-based initiators; and in addition, acid generators such as halides and so forth.

The actinic energy polymerization initiator has a content ratio of 0.2-10 parts by weight, and preferably 0.5-5 parts by weight, based on 100 parts by weight of a cationically polymerizable compound or a radical polymerizable compound. When making a content of the initiator to fall within the above-described range, ink storage stability is improved. These actinic energy radiation polymerization initiators are usable singly, or in combination with two kinds thereof.

Examples of sensitizers for the actinic energy radiation polymerization initiator when a sulfonium salt is used as an initiator include anthracene and anthracene derivatives (for example, Adekaoptomer SP-100, diethoxyanthracene, dibutoxyanthracene and so forth, produced by ADEKA Corporation). When an iodonium salt is used as an initiator, thioxanthones and so forth are usable. These sensitizers can be used singly, or in combinations with at least two kinds thereof. The sensitizer preferably has an addition amount ratio of 0.2-5 parts by weight, and more preferably has an addition amount ratio of 0.5-4 parts by weight, based on 100 parts by weight of a cationically polymerizable compound. When making the addition amount to fall within the above-described range, sensitizing effect is enhanced.

<Colorant>

When chromatic ink of the present invention is prepared via coloration of ink of the present invention; a pigment or an oil-based dye is preferably used as a colorant.

As a pigment, usable is a colorless inorganic or chromatic organic pigment such as carbon black, titanium oxide or calcium carbonate. Examples of the organic pigment include insoluble azo pigments such as Toluidine Red, Toluidine Maroon, Hanza Yellow, Benzidine Yellow, Pyrazolone Red and so forth; soluble azo pigments such as Lithol Red, Helio Bordeaux, Pigment Scarlet, Permanent Red 2B and so forth; derivatives obtained from architectural dyes such as alizarin, indanthrone, Thioindigo Maroon and so forth; phthalocyanine-based organic pigments such as Phthalocyanine Blue, Phthalocyanine Green and so forth; quinacridone-based organic pigments such as Quinacridone Red, Quinacridone Magenta and so forth; perylene-based organic pigments such as Perylene Red, Perylene Scarlet and so forth; isoindolinone-based organic pigments such as Isoindolinone Yellow, Isoindolinone Orange and so forth; pyranthrone-based organic pigments such as Pyranthrone Red, Pyranthrone Orange and so forth; thioindigo-based organic pigments; condensed azo-based organic pigments; benzimidazolone-based organic pigments; quinophtharone-based organic pigments such as Quinophthalone Yellow and so forth; isoindoline-based organic pigments such as Isoindoline Yellow and so forth; and other pigments, such as Flavanthrone Yellow, Acylamide Yellow, Nickel Azo Yellow, Copper Azomethine Yellow, Perynone Orange, Anthrone Orange, Dianthraquinonyl Red, Dioxazine Violet and so forth.

Organic pigments are exemplified below by using color index (C. I.) No.

C. I. Pigment Yellow 12, C. I. Pigment Yellow 13, C. I. Pigment Yellow 14, C. I. Pigment Yellow 17, C. I. Pigment Yellow 20, C. I. Pigment Yellow 24, C. I. Pigment Yellow 74, C. I. Pigment Yellow 83, C. I. Pigment Yellow 86, C. I. Pigment Yellow 93, C. I. Pigment Yellow 109, C. I. Pigment Yellow 110, C. I. Pigment Yellow 117, C. I. Pigment Yellow 120, C. I. Pigment Yellow 125, C. I. Pigment Yellow 128, C. I. Pigment Yellow 129, C. I. Pigment Yellow 137, C. I. Pigment Yellow 138, C. I. Pigment Yellow 139, C. I. Pigment Yellow 147, C. I. Pigment Yellow 148, C. I. Pigment Yellow 150, C. I. Pigment Yellow 151, C. I. Pigment Yellow 153, C. I. Pigment Yellow 154, C. I. Pigment Yellow 155, C. I. Pigment Yellow 166, C. I. Pigment Yellow 168, C. I. Pigment Yellow 180, and C. I. Pigment Yellow 185

C. I. Pigment Orange 16, C. I. Pigment Orange 36, C. I. Pigment Orange 16, C. I. Pigment Orange 43, C. I. Pigment Orange 51, C. I. Pigment Orange 55, C. I. Pigment Orange 59, and C. I. Pigment Orange 61

C. I. Pigment Red 9, C. I. Pigment Red 48, C. I. Pigment Red 49, C. I. Pigment Red 52, C. I. Pigment Red 53, C. I. Pigment Red 57, C. I. Pigment Red 97, C. I. Pigment Red 122, C. I. Pigment Red 123, C. I. Pigment Red 149, C. I. Pigment Red 168, C. I. Pigment Red 177, C. I. Pigment Red 180, C. I. Pigment Red 192, C. I. Pigment Red 202, C.I. Pigment Red 206, C.I. Pigment Red 215, C. I. Pigment Red 216, C. I. Pigment Red 217, C. I. Pigment Red 220, C. I. Pigment Red 223, C. I. Pigment Red 224, C. I. Pigment Red 226, C. I. Pigment Red 227, C. I. Pigment Red 228, C. I. Pigment Red 238, and C. I. Pigment Red 240

C. I. Pigment Violet 19, C. I. Pigment Violet 23, C. I. Pigment Violet 30, C. I. Pigment Violet 37, C. I. Pigment Violet 40, and C. I. Pigment Violet 50

C. I. Pigment Blue 15, C. I. Pigment Blue 15:1, C. I. Pigment Blue 15 3, C. I. Pigment Blue 15:4, C. I. Pigment Blue 15:6, C. I. Pigment Blue 22, C. I. Pigment Blue 60, and C. I. Pigment Blue 64

C. I. Pigment Green 7, and C. I. Pigment Green 36

C. I. Pigment Brown 23, C. I. Pigment Brown 25, and C. I. Pigment Brown 26

Of the above-described pigments, quinacridone-based organic pigments, phthalocyanine-based organic pigments, benzimidazolone-based organic pigments, isoindolinone-based organic pigments, condensed azo-based organic pigments, quinophthalone-based organic pigments, isoindoline-based organic pigments and so forth are preferable, since they exhibit excellent light resistance.

Further, as to a very small amount of a metal ion component contained in an organic pigment, the very small amount of the metal ion component is preferably removed in advance via washing with water or the like, since an initiator component in UV ink and a salt are formed when light leaked from a UV light source hits the nozzle surface of an ink-jet head, resulting in generation of ejection failure, and possibility of accelerating undesired polymerization of a cationic photo-polymerizable monomer appears.

An organic pigment is preferably formed from particles having an average particle diameter of 10-150 nm in ink in terms of the value measured via laser scattering. Light resistance and ejection stability can be designed to be improved by making an average particle diameter of a pigment to fall within the foregoing range. However, in the case of titanium oxide, in order to provide whiteness and hiding power, the average particle diameter is designed to be 150-300 nm, and preferably designed to be 180-250 nm.

Further, coarse particles are preferably eliminated via sufficient dispersion or filtration in such a way that the maximum particle diameter of a pigment in ink does not exceed 1.0 μm. By doing this, ejection stability can be improved.

Microparticulation of an organic pigment can be conducted by the following method. That is, a mixture composed of at least 3 components selected from an organic pigment, a water-soluble inorganic salt of at least 3 times the weight of the amount of the organic pigment, and a water-soluble solvent is arranged in the form of clay; strongly kneaded to conduct Microparticulation of it; and placed in water to prepare a slurry form while stirring with a high speed mixer. Subsequently, the slurry is filtered and washed repeatedly to eliminate the water-soluble inorganic salt and the water-soluble solvent. In the microparticulation process, a resin, a pigment dispersant or the like may be added.

Examples of water-soluble inorganic salts used in the microparticulation process include sodium chloride, potassium chloride and so forth. An amount of each of these inorganic salts is used in the range of 3-20 times the weight of an organic pigment. When the amount of the inorganic salt is less than 3 times the weight of the organic pigment, a treated pigment at a desired size can not be obtained. On the other hand, when the amount of the inorganic salt is larger than 20 times the weight of the organic pigment, a substantial treating amount of the organic pigment is reduced since a large amount of washing treatment is to be applied in the post-process.

A water-soluble solvent is not specifically limited as long as it is employed to efficiently carry out adequate pulverization after an appropriate clay state made from an organic pigment, and a water-soluble inorganic salt used as a pulverizing aid is produced, and is a solvent which is dissolved in water, but a solvent having a high boiling point of 120-250° C. is preferable in view of safety, since the solvent tends to be easily vaporized via temperature rise during kneading. Examples of the water-soluble solvent include 2-(methoxymethoxy)ethanol, 2-butoxyethanol, 2-(i-pentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, low molecular weight polypropylene glycol and so forth.

Further, in order to accelerate adsorption of a pigment dispersant to the surface of a pigment, the pigment is preferably subjected to a surface treatment by a commonly known technology, such as an acidic treatment, a basic treatment, a synergist or each of various coupling agents, in view of ensuring of dispersion stability.

In order to obtain sufficient density and sufficient light resistance, the pigment in ink preferably has a content of 1.5-8% by weight in the case of color other than white, and has a content of 10-30% by weight when employing titanium oxide.

Examples of oil-soluble dyes include a disperse dye, an architectural dye, a sulfur dye, an azo dye, a metal complex dye, a naphthol dye, an anthraquinone dye, an indigo dye, a carbonium dye, a quinoimine dye, a cyanine dye, a quinoline dye, a nitro dye, a nitroso dye, a benzoquinone dye, a naphthoquinone dye, a naphthalimide dye, a perinone dye, a phthalocyanine dye and so forth.

Specific examples of the oil-soluble dyes include C. I. Solvent Yellow 1, C.I. Solvent Yellow 2, C. I. Solvent Yellow 3, C. I. Solvent Yellow 4, C. I. Solvent Yellow 5, C. I. Solvent Yellow 6, C. I. Solvent Yellow 7, C. I. Solvent Yellow 8, C. I. Solvent Yellow 10, C. I. Solvent Yellow 12, C. I. Solvent Yellow 13, C. I. Solvent Yellow 14, C. I. Solvent Yellow 16, C. I. Solvent Yellow 18, C. I. Solvent Yellow 19, C. I. Solvent Yellow 21, C. I Solvent Yellow 25, C. I. Solvent Yellow 25:1, C. I. Solvent Yellow 28, C. I. Solvent Yellow 29, C. I. Solvent Yellow 30, C. I. Solvent Yellow 32, C. I. Solvent Yellow 33, C. I. Solvent Yellow 34, C. I. Solvent Yellow 36, C. I. Solvent Yellow 37, C. I. Solvent Yellow 38, C. I. Solvent Yellow 40, C. I. Solvent Yellow 42, C. I. Solvent Yellow 43, C. I. Solvent Yellow 44, C. I. Solvent Yellow 47, C. I. Solvent Yellow 48, C. I. Solvent Yellow 55, C. I. Solvent Yellow 56, C. I. Solvent Yellow 58, C. I. Solvent Yellow 60, C. I. Solvent Yellow 62, C. I. Solvent Yellow 64, C. I. Solvent Yellow 65, C. I. Solvent Yellow 72, C. I. Solvent Yellow 73, C. I. Solvent Yellow 77, C. I. Solvent Yellow 79, C. I. Solvent Yellow 81, C. I. Solvent Yellow 82, C. I. Solvent Yellow 83, C. I. Solvent Yellow 83:1, C. I. Solvent Yellow 85, C. I. Solvent Yellow 88, C. I. Solvent Yellow 89, C. I. Solvent Yellow 93, C. I. Solvent Yellow 94, C. I. Solvent Yellow 96, C. I. Solvent Yellow 98, C. I. Solvent Yellow 103, C. I. Solvent Yellow 104, C. I. Solvent Yellow 105, C. I. Solvent Yellow 107, C. I. Solvent Yellow 109, C. I. Solvent Yellow 112, C. I. Solvent Yellow 114, C. I. Solvent Yellow 116, C. I. Solvent Yellow 117, C. I. Solvent Yellow 122, C. I. Solvent Yellow 123, C. I. Solvent Yellow 124, C. I. Solvent Yellow 128, C. I. Solvent Yellow 129, C. I. Solvent Yellow 130, C. I. Solvent Yellow 131, C. I. Solvent Yellow 133, C. I. Solvent Yellow 134, C. I. Solvent Yellow 135, C. I. Solvent Yellow 138, C. I. Solvent Yellow 139, C. I. Solvent Yellow 140, C. I. Solvent Yellow 141, C. I. Solvent Yellow 143, C. I. Solvent Yellow 146, C. I. Solvent Yellow 147, C. I. Solvent Yellow 148, C. I. Solvent Yellow 149, C. I. Solvent Yellow 150, C. I. Solvent Yellow 151, C. I. Solvent Yellow 152, C. I. Solvent Yellow 153, C. I. Solvent Yellow 157, C. I. Solvent Yellow 158, C. I. Solvent Yellow 159, C. I. Solvent Yellow 160, C. I. Solvent Yellow 160:1, C. I. Solvent Yellow 161, C. I. Solvent Yellow 162, C. I. Solvent Yellow 163, C. I. Solvent Yellow 164, C. I. Solvent Yellow 165, C. I. Solvent Yellow 167, C. I. Solvent Yellow 168, C. I. Solvent Yellow 169, C. I. Solvent Yellow 170, C. I. Solvent Yellow 171, C. I. Solvent Yellow 172 and so forth; C. I. Solvent Red 1, C. I. Solvent Red 2, C. I. Solvent Red 3, C. I. Solvent Red 4, C. I. Solvent Red 8, C. I. Solvent Red 13, C. I. Solvent Red 14, C. I. Solvent Red 17, C. I. Solvent Red 18, C. I. Solvent Red 19, C. I. Solvent Red 23, C. I. Solvent Red 24, C. I. Solvent Red 25, C. I. Solvent Red 26, C. I. Solvent Red 27, C. I. Solvent Red 29, C. I. Solvent Red 30, C. I. Solvent Red 33, C. I. Solvent Red 35, C. I. Solvent Red 37, C. I. Solvent Red 39, C. I. Solvent Red 41, C. I. Solvent Red 42, C. I. Solvent Red 43, C. I. Solvent Red 45, C. I. Solvent Red 46, C. I. Solvent Red 47, C. I. Solvent Red 48, C. I. Solvent Red 49, C. I. Solvent Red 49:1, C. I. Solvent Red 52, C. I. Solvent Red 68, C. I. Solvent Red 69, C. I. Solvent Red 72, C. I. Solvent Red 73, C. I. Solvent Red 74, C. I. Solvent Red 80, C. I. Solvent Red 81, C. I. Solvent Red 82, C. I. Solvent Red 83, C. I. Solvent Red 83:1, C. I. Solvent Red 84, C. I. Solvent Red 84:1, C. I. Solvent Red 89, C. I. Solvent Red 90, C. I. Solvent Red 90:1, C. I. Solvent Red 91, C. I. Solvent Red 92, C. I. Solvent Red 106, C. I. Solvent Red 109, C. I. Solvent Red 111, C. I. Solvent Red 117, C. I. Solvent Red 118, C. I. Solvent Red 119, C. I. Solvent Red 122, C. I. Solvent Red 124, C. I. Solvent Red 125, C. I. Solvent Red 127, C. I. Solvent Red 130, C. I. Solvent Red 132, C. I. Solvent Red 135, C. I. Solvent Red 138, C. I. Solvent Red 140, C. I. Solvent Red 143, C. I. Solvent Red 145, C. I. Solvent Red 146, C. I. Solvent Red 149, C. I. Solvent Red 150, C. I. Solvent Red 151, C. I. Solvent Red 152, C. I. Solvent Red 155, C. I. Solvent Red 160, C. I. Solvent Red 164, C. I. Solvent Red 165, C. I. Solvent Red 166, C. I. Solvent Red 168, C. I. Solvent Red 169, C. I. Solvent Red 172, C. I. Solvent Red 175, C. I. Solvent Red 176, C. I. Solvent Red 177, C. I. Solvent Red 179, C. I. Solvent Red 180, C. I. Solvent Red 181, C. I. Solvent Red 182, C. I. Solvent Red 185, C. I. Solvent Red 188, C. I. Solvent Red 189, C. I. Solvent Red 195, C. I. Solvent Red 198, C. I. Solvent Red 202, C. I. Solvent Red 203, C. I. Solvent Red 204, C. I. Solvent Red 205, C. I. Solvent Red 206, C. I. Solvent Red 207, C. I. Solvent Red 208, C. I. Solvent Red 209, C. I. Solvent Red 210, C. I. Solvent Red 212, C. I. Solvent Red 213, C. I. Solvent Red 214, C. I. Solvent Red 215, C. I. Solvent Red 216, C. I. Solvent Red 217, C. I. Solvent Red 218, C. I. Solvent Red 219, C. I. Solvent Red 220, C. I. Solvent Red 221, C. I. Solvent Red 222, C. I. Solvent Red 223, C. I. Solvent Red 224, C. I. Solvent Red 225, C. I. Solvent Red 226, C. I. Solvent Red 227, C. I. Solvent Red 228, C. I. Solvent Red 229 and so forth; C. I. Solvent Blue 2, C. I. Solvent Blue 4, C. I. Solvent Blue 5, C. I. Solvent Blue 7, C. I. Solvent Blue 10, C. I. Solvent Blue 11, C. I. Solvent Blue 12, C. I. Solvent Blue 14, C. I. Solvent Blue 22, C. I. Solvent Blue 25, C. I. Solvent Blue 26, C. I. Solvent Blue 35, C. I. Solvent Blue 36, C. I. Solvent Blue 37, C. I. Solvent Blue 38, C. I. Solvent Blue 43, C. I. Solvent Blue 44, C. I. Solvent Blue 45, C. I. Solvent Blue 48, C. I. Solvent Blue 49, C. I. Solvent Blue 50, C. I. Solvent Blue 51, C. I. Solvent Blue 59, C. I. Solvent Blue 63, C. I. Solvent Blue 64, C. I. Solvent Blue 66, C. I. Solvent Blue 67, C. I. Solvent Blue 68, C. I. Solvent Blue 70, C. I. Solvent Blue 79, C. I. Solvent Blue 81, C. I. Solvent Blue 83, C. I. Solvent Blue 91, C. I. Solvent Blue 94, C. I. Solvent Blue 95, C. I. Solvent Blue 97, C. I. Solvent Blue 98, C. I. Solvent Blue 99, C. I. Solvent Blue 100, C. I. Solvent Blue 102, C. I. Solvent Blue 104, C. I. Solvent Blue 105, C. I. Solvent Blue 108, C. I. Solvent Blue 111, C. I. Solvent Blue 112, C. I. Solvent Blue 116, C. I. Solvent Blue 117, C. I. Solvent Blue 118, C. I. Solvent Blue 122, C. I. Solvent Blue 127, C. I. Solvent Blue 128, C. I. Solvent Blue 129, C. I. Solvent Blue 130, C. I. Solvent Blue 131, C. I. Solvent Blue 132, C. I. Solvent Blue 133, C. I. Solvent Blue 134 and so forth; and C. I. Solvent Black 3, C. I. Solvent Black 5, C. I. Solvent Black 6, C. I. Solvent Black 7, C. I. Solvent Black 8, C. I. Solvent Black 13, C. I. Solvent Black 22, C. I. Solvent Black 22:1, C. I. Solvent Black 23, C. I. Solvent Black 26, C. I. Solvent Black 27, C. I. Solvent Black 28, C. I. Solvent Black 29, C. I. Solvent Black 33, C. I. Solvent Black 34, C. I. Solvent Black 35, C. I. Solvent Black 39, C. I. Solvent Black 40, C. I. Solvent Black 41, C. I. Solvent Black 42, C. I. Solvent Black 43, C. I. Solvent Black 45, C. I. Solvent Black 46, C. I. Solvent Black 47, C. I. Solvent Black 48, C. I. Solvent Black 49, C. I. Solvent Black 50 and so forth.

Of these oil-soluble dyes, specifically, C. I. Solvent Yellow 3, C. I. Solvent Yellow 14, C. I. Solvent Yellow 16, C. I. Solvent Yellow 33, C. I. Solvent Yellow 56; C. I. Solvent Red 18, C. I. Solvent Red 24, C. I. Solvent Red 27, C. I. Solvent Red 122, C. I. Solvent Red 135; C. I. Solvent Blue 14, C. I. Solvent Blue 25, C. I. Solvent Blue 35, C. I. Solvent Blue 48, C. I. Solvent Blue 108; C. I. Solvent Black 3, C. I. Solvent Black 22, C. I. Solvent Black 34, and C. I. Solvent Black 50 are suitably usable, since they exhibit high dye-toughness.

An addition amount of the oil-soluble dye is preferably 0.5-90%, and more preferably 1-70% with respect to ink.

<<Pigment Dispersant>>

Examples of pigment dispersants include a hydroxyl group-containing carboxylic acid ester, a salt of long-chain polyaminoamide and high molecular weight acid ester, a salt of a high molecular weight polycarboxylic acid, a salt of long-chain polyaminoamide and polar acid ester, high molecular weight unsaturated acid ester, a copolymer, modified polyurethane, modified polyacrylate, a polyether ester-type anionic active agent, a naphthalenesulfonic acid formalin condensate salt, an aromatic sulfonic acid formalin condensate salt, polyoxyethylene alkyl phosphoric acid ester, polyoxyethylene nonylphenyl ether, stearyl amine acetate, a pigment derivative, and so forth.

Specific examples thereof include "Anti-Terra-U (a polyaminoamide phosphoric acid salt)," "Anti-Terra-203/204 (a high molecular weight polycarboxylic acid salt)," "Disperbyk-101 (a polyaminoamide phosphoric acid salt and acid ester), 107 (a hydroxyl group-containing carboxylic acid ester), 110 (an acid group-containing copolymer), 130 (polyamide), 161, 162, 163, 164, 165, 166, and 170 (a copolymer)," "400," "Bykumen (high molecular weight unsaturated acid ester)," "BYK-P104, P105 (a high molecular weight unsaturated acid polycarboxylic acid)," "P104S, 2405 (a high molecular weight unsaturated acid polycarboxylic acid and a silicon-type)," and "Lactimon (a long-chain amine, an unsaturated acid polycarboxylic acid, and silicon)", produced by BYK Chemie GmbH.

Further, examples thereof include "Efka 44, Efka 46, Efka 47, Efka 48, Efka 49, Efka 54, Efka 63, Efka 64, Efka 65, Efka 66, Efka 71, Efka 701, Efka 764, Efka 766, Efka Polymer 100 (modified polyacrylate), Efka Polymer 150 (aliphatic modified polymer), Efka Polymer 400, Efka Polymer 401, Efka Polymer 402, Efka Polymer 403, Efka Polymer 450, Efka Polymer 451, Efka Polymer 452, Efka Polymer 453 (modified polyacrylate) and Efka Polymer 745 (copper phthalocyanine type), produced by Efka Chemicals Co."; "Flowlen TG-710 (urethane oligomer), Flownon SH-290, Flownon SP-1000, Polyflow No. 50E and Polyflow No. 300 (acrylic copolymer), produced by Kyoeisha Chemicals Co., Ltd."; and "Disparlon KS-860, Disparlon 873 SN, Disparlon 874 (polymer dispersant), #2150 (aliphatic polycarboxylic acid) and #7004 (polyether ester type), produced by Kusumoto Chemicals, Ltd", and so forth.

Furthermore, examples thereof include "Demol RN, Demol N (naphthalene sulfonic acid formalin condensate sodium salt), Demol MS, Demol C, Demol SN-B (aromatic sulfonic acid formalin condensate sodium salt), Demol EP, Homogenol L-18 (polycarboxylic acid type polymer), Emulgen 920, Emulgen 930, Emulgen 931, Emulgen 935, Emulgen 950, Emulgen 985 (polyoxyethylene nonylphenyl ether), Acetamin 24 (coconut amine acetate) and Acetamin 86 (stearylamine acetate), produced by Kao Corporation"; "Solsperse 5000 (phthalocyanine ammonium salt type), Solsperse 13240, Solsperse 13940 (polyester amine type), Solsperse 17000 (fatty acid amine type), Solsperse 24000, Solsperse 32000 and Solsperse 7000", produced by Zeneca Co., Ltd.; "Nikkol T106 (polyoxyethylene sorbitan monooleate), Nikkol MYS-IEX (polyoxyethylene monostearate) and Hexagline 4-0 (hexaglyceryl tetraoleate), produced by Nikko Chemicals Co., Ltd."; and "AJISPER 821, AJISPER 822 and AJISPER 824, produced by Ajinomoto Fine-Techno Co., Inc.", and so forth.

These pigment dispersants each preferably have a content of 5-70% by weight, and more preferably have a content of 10-50% by weight, based on 100% by weight of a pigment.

When making the content of the pigment dispersant to fall within the foregoing range, dispersion stability and ejection stability are improved.

Further, these pigment dispersants each preferably exhibit a solubility of at least 5% by weight with respect to the entire cationically polymerizable compound or radically polymerizable compound. When making the solubility to fall within the foregoing range, ink storage stability and ejection stability are improved.

<<Polymerization Inhibitor>>

In the present invention, a cationic polymerization inhibitor is preferably added in ink containing a cationically polymerizable compound. A polymerization inhibitor is preferably added intentionally, since vinyl ether has high reactivity, and dark reaction is easy to be accelerated with a residual acid or an acid slightly generating from a polymerization initiator during storage. Examples of the polymerization inhibitor include at least one of an alkali metal compound and an alkaline earth metal compound, or amities. The amines are preferable since alkali metal ions are desired not to be added as after-mentioned.

As the amines, preferably cited are alkanolamines, N,N-dimethylalkylamines, N,N-dimethylalkenylamines, N,N-dimethylalkynylamines and so forth, and specific examples thereof include triethanolamine, triisopropanolamine, tributanolamine, N-ethyldiethanolamine, propanolamine, n-butylamine, sec-butylamine, 2-aminoethanol, 2-methylaminoethanol, 3-methylamino-1-propanol, 3-methylamino-1,2-propanediol, 2-ethhylaminoethanol, 4-ethylamino-1-butanol, 4-(n-butylamino)-1-butanol, 2-(t-butylamino) ethanol, N,N-dimethylundecanol, N,N-dimethyldodecanolamine, N,N-dimethyltridecanolamine, N,N-dimethyltetradecanolamine, N,N-dimethylpentadecanolamine, N,N-nonadecylamine, N,N-dimethylicosylamine, N,N-dimethyleicosylamine, N,N-dimethylhenicosylamine, N,N-dimethyldocosylamine, N,N-dimethyltricosylamine, N,N-dimethyltetracosylamine, N,N-dimethylpentacosylamine, N,N-dimethylpentanolamine, N,N-dimethylhexylamine, N,N-dimethylheptanolamine, N,N-dimethyloctanolamine, N,N-dimethylnonanolamine, N,N-dimethyldecanolamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, and N,N-dimethyloctadecylamine. In addition to these, a quaternary ammonium salt and so forth are usable.

The photo-cationic polymerization inhibitor preferably has an addition amount of 10-5000 ppm. Storage stability, ejection stability and curing sensitivity are improved when the addition amount of the photo-cationic polymerization inhibitor falls within the foregoing range.

Further, as to ink of the present invention, a radical polymerization inhibitor is preferably added after the cationic polymerization inhibitor is added in ink containing a cationically polymerizable compound. The storage stability of ink can be improved by using the radical polymerization inhibitor in combination, even though impurities and a residual acid are present in the ink.

Examples of the radical polymerization inhibitor include methoquinone (hydroquinone monomethyl ether), hydroquinone, 4-methoxy-1-naphthol, a hindered amine-based antioxidant, a nitrogen-containing heterocyclic mercapto-based compound, a thio ether-based antioxidant, a hindered phenol-based antioxidant, an ascorbic acid, zinc sulfate, a thiocyanic acid salt, a thiourea derivative, various saccharides, a phosphoric acid-based antioxidant, a nitrous acid salt, a sulfurous acid salt, thiosulfuric acid salts, a hydroxylamine derivative, a polycondensate of dicyandiamide and polyalkylenepolyamine, and so forth.

The radical polymerization inhibitor preferably has an addition amount of 10-5000 ppm. Storage stability, ejection stability and curing sensitivity are improved when the addition amount of the radical polymerization inhibitor falls within the foregoing range.

<<Metal Ion>>

As to the ink of the present invention, the total amount of Na ion, Ca ion and Mg ion in the ink containing a cationically polymerizable compound is preferably 100 ppm or less. After the ink is mixed with pure water, and these ions separate a water phase, the ions extracted in a water phase can be quantitated via ion chromatography.

These alkali metal ions produce no problem during conventional storage of ink, but when the ink is exposed to actinic energy radiation, whereby various decomposing materials and active species are produced from the polymerization initiator, a poorly-soluble salt tends to be formed. For this reason, in cases where ink is ejected for a long duration, a poorly-soluble precipitate is produced around an opening of an ink-jet nozzle, resulting in decline in ejection accuracy.

A method of reducing an amount of alkali metal ions in ink is achieved by purifying each of various materials to be used. Specifically, since a pigment, a polymerization initiator such as a sulfonium salt or the like, a dispersant, and a cationic polymerization initiator such as vinyl ether, oxetane, epoxy or the like which are commercially available tend to contain alkali metal ions as impurities in a manufacturing process thereof they should be used after appropriately purifying each material. A content of counter anions is also reduced via purification of the alkali metal, and this produces an effect through which drop of ationic polymerization caused by impurities is suppressed.

Further, it is preferred to reduce halogen ion species such as chloride and so forth as low as possible. Reactivity of a vinyl ether compound can be increased by reducing halogen ion species. That total amount of halogen ions is preferably less than 50 ppm, and more preferably less than 10 ppm. Reduction of halogen ion species is possible to be achieved by purifying raw material, similarly to reduction of the foregoing alkali metal ion species.

The following organic solvents are usable for ink of the present invention.

Examples of solid organic solvents include natural wax, such as beeswax, carnauba wax, rice wax, Japan wax, jojoba oil, spermaceti, candelira wax, lanolin wax, montan wax, ozocerite, ceresin, paraffin wax, microcrystalline wax, petrolactam or the like; an organic acid such as polyethylene wax, chlorinated hydrocarbon, a palmitic acid, a stearic acid, a behenic acid, a tiglic acid, a 2-acetonaphthobehenic acid, a 12-hydroxystearic acid, a dihydroxystearic acid or the like; alcohol such as dodecanol, tetradecanol, hexadecanol, eicosanol, docosanol, tetracosanol, hexacosanol, octacosanol, dodesenol, myricyl alcohol, tetrasenol, hexadecenol, eicosenol, docosenol, pinene glycol, hinokiol, butyne diol, nonane diol, isophthalyl alcohol, methothelin, hexane diol, decane diol, tetradecane diol, hexadecane diol, docosane diol, tetracosane diol, terpineol, phenyl glycerin, eicosane diol, octane diol, phenyl propylene glycol or the like; phenol such as bisphenol A, p-α-cumylphenol or the like; organic acid ester such as glycerin of the foregoing organic acid, ethylene glycol, diethylene glycol or the like; cholesterol aliphatic acid ester such as cholesterol stearate, cholesterol palmitate, cholesterol myristate, cholesterol behenate, cholesterol laurate, cholesterol melissate or the like; saccharide aliphatic acid ester such as sucrose behenate, sucrose laurate, sucrose melissate, lactose stearate, lactose palmitate, lactose behenate, lactose laurate, lactose melissicate or the like; ketone such as benzoyl acetone, diacetobenzene, benzophenone, tricosanone, heptacosanone, heptatriacontanone, hentriacontanone, stearone, laurone or the like; amide such as oleic acid amide, lauric acid amide, stearic acid amide, ricinic acid amide, palmitic acid amide, tetrahydrofuran acid amide, erucic acid amide, myristic acid amide, 12-hydroxystearic acid, N-stearyl erucic acid amide, N-oleyl stearic acid amide, N,N-ethylene bislauric acid amide, N,N-ethylene bisstearic acid amide, N,N-ethylene bislauric acid amide, N,N-ethylene bisstearic acid amide, N,N-ethylene bisbehenic acid amide, N,N-xylylene bisstearic acid amide, N,N-butylene bisstearic acid amide, N,N-dioleyl adipic acid amide, N,N-dioleyl sebacic acid amide, N,N-distearyl sebacic acid amide, N,N-distearyl terephthalic acid amide, phenacetin, toluamide, acetoamide or the like; sulfonamide such as p-toluene sulfonamide, ethyl benzene sulfonamide, butyl benzene sulfonamide or the like; alkyl naphthalene such as α-methyl naphthalene, β-methyl naphthalene, 2,6-dimethyl naphthalene or the like; carboxylic acid ester such as dibutyl naphthalate, dioctyl naphthalate, dibutyl adipate dimethyl terephthalate, benzyl benzoate, naphthalene-2,6-dicarboxylic acid methyl ester or the like; and a phosphoric acid ester such as phosphoric acid tributyl, phosphoric acid triphenyl or the like.

As an oil-based medium in the form of liquid, provided is an organic solvent or a mixed medium made from at least two organic solvents. Examples of the organic solvent include alcohol such as ethanol, pentanol, heptanol, octanol, cyclohexanol, benzyl alcohol, phenylethyl alcohol, phenylpropyl alcohol, furfuryl alcohol, anisyl alcohol, or the like; a glycol derivative such as ethyl glycol monoethylether, ethylene glycol monophenyl ether, diethylene glycol monoethyl ether, diethylene glycol monobutyl ether, propylene glycol monoethyl ether, propylene glycol monophenyl ether, dipropylene glycol monomethyl ether, dipropylene glycol monoethyl ether, fripropylene glycol monoethyl ether, ethylene glycol diacetate, ethylene glycol monoethyl ether acetate, propylene glycol diacetate or the like; ketone such as benzyl methyl ketone, diacetone alcohol, cyclohexanone or the like; ether such as butylphenyl ether, benzylethyl ether, hexyl ether or the like; ester such as ethyl acetate, amyl acetate, benzyl acetate, phenylethyl acetate, phenoxyethyl acetate, ethylphenyl acetate, benzyl propionate, ethyl benzoate, butyl benzoate, ethyl laurate, butyl laurate, isopropyl myristate, isopropyl palmitate, triethyl phosphate, tributyl phosphate, tricresyl phosphate, diethyl phthalate, dibutyl phthalate, diethyl malonate, dipropyl malonate, diethyl diethylmalonate, diethyl succinate, dibutyl succinate, diethyl glutarate, diethyl adipate, dibutyl adipate, di(2-methoxyethyl)adipate, diethyl sebacate, diethyl maleate, dibutyl maleate, dioctyl maleate, diethyl fumarate, dioctyl fumarate, 3-hexenyl cinnamate or the like; a hydrocarbon based solvent such as petroleum ether, petroleum benzyl, tetralin, delican, 1-amyl benzene, dimethyl naphthaline or the like; and a polar solvent such as acetonitrile, formamide, N,N-dimethyl formamide, N,N-dimethyl acetoamide, dimethyl sulfoxide, sulfolane, propylene carbonate, N-methyl-2-pyrrolidone, N-vinyl-2-pyrrolidone, N-diethyldodecane amide or the like. These solvents may be used singly, or in combination with at least two kinds thereof.

<<Other Additives>>

Various additives such as a surfactant, a lubricant, a filler, a corrosion control agent, an antifoam agent, a thickener, a gelling agent, and polymers each can be contained in ink of the present invention, if desired.

Further, a small amount of a solvent such as an ester based solvent, an ether based solvent, an ether ester based solvent, a ketone based solvent, an aromatic hydrocarbon solvent, a nitrogen-containing organic solvent or the like can be also added therein, if desired.

<<Ink Property>>

As to a preferred embodiment for the ink property in the present invention, when DSC measurement is conducted in the range of 25° C. and 25° C. at a descending rate of 5° C./min, an amount of heat generation per unit mass does not exhibit an exothermic peak of not less than 10 mJ/mg. Heat generation higher than a definite quantity of heat generation can be suppressed in the DSC measurement by choosing the material in accordance with a structure of the present invention. In such a structure, generation of gel and generation of precipitates can be suppressed even in the case where ink is stored at low temperature.

<<Preparation Method of Ink>>

The ink of the present invention is prepared by sufficiently dispersing a pigment in addition to vinyl ether and a pigment dispersant employing a conventional dispersing machine such as a sand mill or the like. A condensed liquid having high concentration of the pigment has been prepared in advance, and it is preferably diluted with an actinic energy radiation curable compound. It is possible to conduct sufficient dispersion also in the case of dispersion with a conventional dispersing machine. For this reason, the ink component is not difficult to be altered during dispersion, and ink exhibiting excellent stability can be prepared because of neither excessive dispersion energy to be applied thereto, nor a great deal of dispersion time to be required. The prepared ink is preferably filtrated employing a filter having an opening diameter of 3 μm or less, and preferably having an opening diameter of 1 μm or less.

As to dispersion of the pigment, a pigment, a dispersant, selection of a dispersing medium, a dispersion condition and a filtration condition are to be designed so as to make the average particle diameter to be 0.08-0.5 μm; preferably to be 0.3-3 μm; and to be 0.3-10 μm as the maximum particle diameter. The average particle diameter means a mean value of diameters when each primary particle or its aggregate is converted into a sphere having the same volume as that of the primary particle or the aggregate (sphere-conversion particle diameter), and this value can be evaluated from electron micrographs. Specifically, the mean value of the sphere-conversion particle diameter can be calculated using an image processing program fitted with a transmission electron microscope (JEM 2010F) manufactured by JEOL Ltd. That is, transmission electron micrographs of particle powder are taken, at least 200 particles in a predetermined visible range are measured to measure a sphere-conversion particle diameter of each particle and to determine the mean value obtained from each of the resulting values. Head nozzle clogging is inhibited via control of this particle diameter, and ink storage stability, ink transparency and curing sensitivity can be maintained.

A pigment or an oil-soluble dye preferably has an addition amount of 0.1-20% by weight, and more preferably has an addition amount of 0.4-10% by weight. In the case of 0.1% by weight or more, excellent image quality can be obtained, and in the case of 20% by weight or less, suitable ink viscosity during ink-ejection can be obtained. Further, at least two kinds of colorants are appropriately mixed, and are usable for color-adjustment and so forth.

Various synthetic resins employed in various applications are applicable for substrates used in ink-jet recording, and examples thereof include polyester, polyvinyl chloride, polyethylene, polyurethane, polypropylene, an acrylic resin, polycarbonate, polystyrene, an acrylonitrile-butadiene-styrene copolymer, polyethylene terephthalate, polybutadiene terephthalate and so forth. The thickness and the shape of each of these synthetic resin substrates are not specifically limited. In addition to the above-described, metals, glass and printing paper are also usable.

Paper is classified into coated paper and non-coated paper. Examples of the coated paper include art paper having a one surface coated amount of approximately 20 $g/m^2$; coated paper having a one surface coated amount of approximately 10 $g/m^2$; light weight coated paper having a one surface coated amount of approximately 5 $g/m^2$; ultra-light weight coated paper; matte-finished coated paper; dull finished dull-coated paper; newspaper; and so forth. Examples of the non-coated paper include printing paper A having a chemical pulp content of 100%, printing paper B having a chemical pulp content of at least 70%, printing paper C having a chemical pulp content of 40-70%, printing paper D having a chemical pulp content of less than 40%, gravure paper containing mechanical pulp, which has been subjected to a calendar treatment, and so forth. More details are described in "Saishin Kamikako Binran (Handbook of Recent Paper Treatments)", edited by Kako Binran Henshuiinkai, published by Tech. Times, "Insatsu Kogaku Binran (Printing Engineering Handbook)", edited by Nihon Insatsu Gakkai (The Japanese Society of Printing Science and Technology), and so forth.

As plain paper, 80-200 μm thick non-coated paper belonging to a part of non-coated paper, special printing paper and information paper is used. Examples of the plain paper usable in the present invention include high-grade printing paper, medium-grade printing paper, and low-grade printing paper, thin printing paper, ultra-light weight coated printing paper, special printing paper sheets such as high-quality colored paper sheets, form printing paper sheets, PPC sheets, and in addition, information sheets, but the present invention is not specifically limited thereto.

As various kinds of films, all of those conventionally used are usable. Examples thereof include a polyester film, a polyolefin film, a polyvinyl chloride film, polyvinylidene chloride film and so forth. Further, resin-coated paper as photographic printing paper and YUPO paper as synthetic paper are usable.

<<Ink-jet Ink Set>>

It is a feature that an ink-jet ink set of the present invention (hereinafter, referred to also as an ink set) possesses chromatic ink containing an actinic energy radiation curable composition, a gelling agent with which a thermoreversible gel is formed, and a colorant; and colorless ink containing no colorant but the actinic energy radiation curable composition and the gelling agent, and the gelling agent contained in the chromatic ink has a higher melting temperature than that of the gelling agent contained in the colorless ink.

As to the melting temperature of the gelling agent in the present invention, a temperature at which viscosity rapidly drops when varying the temperature is possible to be measured as the melting temperature, for example, under the condition of Shear Rate=100 (1/s), employing Rheometer MCR300 (manufactured by Physica).

<<Ink-Jet Recording Head>>

In the ink-jet image forming method of the present invention, ink according to the present invention is ejected onto a recording medium with an ink-jet recording head to form images, but any of an on-demand system and a continuous system is allowed to be used as an ink-jet recording head employed in the ink-jet image forming method of the present invention. Further, specific examples of ejection systems include an electrical-mechanical conversion system (for example, a single cavity type, a double cavity type, a vendor type, a piston type, a share mode type, a shared wall type or the like); an electrical-thermal conversion system (for example, a thermal ink-jet type, a bubble jet type (registered trademark) or the like); an electrostatic suction type (for example, an electric field control type, a slit jet type or the like); a discharge type (for example, a spark jet type or the like), and so forth, but may be listed as a concrete example, and any of the ejection types is allowed to be used.

[Line Head Type Ink-jet Recording Head]

Further, it is a feature in the ink-jet image forming method that an ink-jet recording head fitted with a line head system in string demand with respect to clogging is used as a printing system. The line type ink-jet recording head means a long-length ink-jet recording head having a length longer than the width of the recording medium, and is preferably usable even though it is a long-length head having a large number of nozzles, or an elongated head in which plural ink-jet recording heads are unitized. In comparison to a serial head in which a carriage equipped with a recording head is scanned in the direction perpendicular to the direction of conveying the recording medium to form images, a great deal of recording becomes possible to be carried out in a short period of time by using the line head type ink-jet head, whereby productivity can be largely improved.

<<Ink-ejection Condition>>

It is preferable as the ink-ejecting condition that a recording head and ink are heated to a temperature of 35-130° C. to eject the ink. Since the ink of the present invention has a large viscosity fluctuation band produced by temperature variation, and the viscosity fluctuation largely influences liquid droplet size and liquid droplet ejection speed directly, resulting in deterioration of images, it is preferable to maintain the temperature in the predetermined range while increasing ink temperature, and to conduct ejection thereof in that state. This predetermined temperature range is preferably preset temperature ±5° C., more preferably preset temperature ±2° C., and still more preferably preset temperature ±1° C. The preset temperature described here means a reference temperature having been set as ink temperature during ejection of ink.

Further, the liquid droplet size of chromatic ink ejected from each nozzle of the recording head is preferably 1-15 pl. In order to actually form high quality images, the liquid droplet size should fall within this range, but the foregoing ejection stability is badly influenced when the ejection is carried out at this liquid droplet size. In the case of the present invention, even though ejection is carried out with a small liquid droplet amount like an ink liquid droplet size of 1-15 pl, ejection stability is improved, whereby high quality images can be stably formed.

<<Printing Method Employing Chromatic Ink and Colorless Ink>>

Colorless ink and chromatic ink containing a colorant are to be used in combination for an image forming method to obtain the effect of the present invention. This means that liquid droplets ejected from an ink-jet head are deposited onto a printing substrate, and subsequently solidified because of rapid drop of the liquid droplet temperature through the effect produced by a gelling agent contained in the chromatic ink. Therefore, dispersion of dots after deposition thereof is hardly observed, and ink liquid droplets are present on a substrate, wherein the ink liquid droplets are elevated from the substrate. For this reason, it is made clear via studies done by the inventors that difference in gloss between the printing portion and the non-printing portion has become large, and image printing durability and paper-transportability during continuous printing have been degraded in addition to low glossiness. In contrast, the above-described performance can be improved by forming images employing chromatic ink and colorless ink; specifically by evenly providing colorless ink on the entire surface of the image forming region after providing chromatinc ink on a substrate thereof, or reversely imagewise-applying the chromatic ink and the colorless ink thereto. Herein, "evenly providing - - - " means providing a coating amount of the colorless ink with the amount kept constant, and "reversely imagewise-applying - - - " means providing in such a way that the total coating amount of chromatic ink and colorless ink becomes constant, wherein coating is carried out in such a way that a coating amount of the colorless ink is increased at a part where the chromatic ink is smaller in coating amount than the colorless ink, and reversely, a coating amount of the colorless ink is decreased at a part where the chromatic ink is larger in coating amount than the colorless ink.

Further, "providing colorless ink on the entire surface of the image forming region" means providing the colorless ink on the entire surface of a substrate on which the chromatiob ink has been provided as a prospective finished piece at the final stage.

In such case, the total coating amount of the chromatic ink and the achromatic ink is preferably designed to be 5 ml/m$^2$ or more; more preferably designed to be 5-30 ml/m$^2$; and still more preferably designed to be 5-20 ml/m$^2$. When making this coating amount to fall within the above-described range, prints exhibiting excellent paper transportability and printing durability together with high density can be obtained. Ejection timing of the colorless ink from an ink-jet head should be retarded with respect to the chromatic ink to make the colorless ink to coat an image formed with the chromatic ink. To do this, the position at which a colorless ink head is placed may be placed further on the downstream side in comparison to the position at which a chromatic ink head, and the ejection timing may also be electrically retarded.

In order to enhance the effect of the present invention, reversely imagewise-applying a coating amount of the colorless ink with respect to a coating amount of the chromatic ink is preferable. That is, a coating amount of the colorless ink is increased at a part where the chromatic ink is smaller in coating amount than the colorless ink, and at a part where the chromatic ink is larger in coating amount than the colorless ink, a coating amount of the colorless ink is reversely decreased. In this case, by making the total coating amount of chromatic ink and colorless ink to be constant at the entire image recording region, transportability and printing durability during continuously printing can be further improved. Herein, "making the total coating amount of chromatic ink and colorless ink to be constant" means that the total coating amount of the chromatic ink and colorless ink falls within the range of ±5% with respect to the reference coating amount arranged to be set in advance.

Further, in order to improve this effect, the chromatic ink should have large liquid droplets in size than those of the colorless ink when ejecting the colorless ink from an ink-jet head. In this case, those of the colorless ink are preferably 1-65 pl larger in size than those of the chromatic ink, and more preferably 4-35 pl larger in size than those of the chromatic ink.

As a role of the colorless ink, it may be evenly provided on the entire image region, or be provided in the reverse application. For this reason, the colorless ink should not be printed in high definition, printing at low resolution is advantageous for evenly being provided thereon. The chromatic ink has a liquid droplet size of 1-15 pl, but the colorless ink preferably has a liquid droplet size of 2-80 pl, and more preferably has a liquid droplet size of 5-50 pl.

Further, as a method to improve printing durability and so forth, there is a technique in which a melting temperature of a gelling agent contained in the chromatic ink is designed to be higher than a melting temperature of a gelling agent contained in the colorless ink. In this case, the melting temperature of the gelling agent contained in the chromatic ink is preferably 5-80° C. higher than the melting temperature of the gelling agent contained in the colorless ink, and more preferably 10-50° C. higher than the melting temperature of the gelling agent contained in the colorless ink.

There are various methods to measure the gelling agent of the present invention, but for example, temperature at which viscosity rapidly drops when varying the temperature under the condition of Shear Rate=1000 (1/s), employing a rheometer MCR300 (manufactured by Physica) is also possible to be measured as a melting temperature.

As a monomer to produce polymerization reaction with actinic energy radiation, used for the colorless ink, any of a radical monomer and a cationic monomer is applicable, but as monomers used for the chromatic ink and the colorless ink, those in the same category are preferable used in vie of transparency of images and adhesion of the colorless ink to the images formed with the chromatic ink.

<<Post-Treatment with Heating or Pressure-application>>

In order to further enhance the effect of the present invention, ink provided on a substrate is preferably subjected to at least one of a heat treatment and a pressure-application treatment after providing the chromatic ink and the achromatic ink, and before exposure to actinic energy radiation.

This further enhances the effect of the present invention when smoothness of the print is further given via application of physical energy to ink provided on a substrate after the colorless ink has been provided on the substrate.

As a method of heating or pressure-application, preferable is one similarly to a method of making copying paper sheets to pass through between a heat roll and a pressure roll which are rotated and brought into contact with each other in order to secure a toner image transferred from the surface of a photoreceptor to a transferred material such as a copying paper sheet, to the transferred material in an image forming apparatus in which an electrophotographic process is utilized, such as an electrophotographic copying machine, an electrophotographic printer or the like. A post-treatment is preferably conducted by a method by which a toner image on a copying paper sheet is thermally fused and firmly fixed; a method employing a fixing belt composed of at least a substrate and a releasing layer formed on the substrate surface is used, wherein the releasing layer is made of a silicone resin; a method employing a fixing belt in which provided is a surface layer in such a way that a curable modified silicon resin is contained in the outermost surface (corresponding to a releasing layer) farthest from a substrate (a base material) of a fixing member; or the like.

Further, in a heat-fixing treatment, energy may be applied to an image to sufficiently produce the effect of the present invention, but a heating temperature of 50-200° C. is preferable, and a heating temperature of 60-160° C. is preferable.

Heating may be conducted with a heater installed in a printer, or with a separately provided heater. As a heating means, in the case of both a fixing roller as well as a fixing belt, a heat roller is preferably used since generation of fixing unevenness can be inhibited, and a continuous treatment can be carried out in a small space. Further, these devices are costly advantageous since these devices each to be used can be diverted as an electrophographic heat-fixing device.

The heat roller has a roller in the form of a hollow as a constituent component, and is rotated by a driving means, but for example, a halogen lamp heater, a ceramic heater or a heat generator made from a nichrome wire is preferably installed in the hollow portion as a heat source.

Further, the roller is preferably made of a material exhibiting high heat conduction, and specifically, a metal roller is preferable, but among the metal rollers, a nickel roller is preferable.

Pressure is preferably applied simultaneously with or immediately after heating in order to obtain higher texture and gloss. An applied pressure of $9.8 \times 10^4$ Pa to $4.9 \times 10^6$ Pa is preferable.

In the ink-jet image forming method of the present invention, examples of actinic energy rays for ink deposited onto a recording medium, which is exposed to the actinic energy rays include an electron beam, UV rays, α rays, β rays, γ rays, X-rays and so forth, but the electron beam and the UV rays which exhibit little danger to a human body, can be easily handled; and has been industrially available are preferable. In the present invention, UV rays are specifically preferable.

When using electron beam, the irradiating electron beam preferably has an amount of 0.1-30 Mrad. When making the amount of electron beam to fall within the range, it surely appears that the irradiating effect is enhanced.

When employing UV rays, usable examples of light sources include a low-pressure mercury lamp, a medium-pressure mercury lamp and a high-pressure lamp mercury lamp and a metal halide lamp which have an operating pressure from several hundreds Pa to 1 MPa, and those conventionally known such as a xenon lamp having an emission wavelength in an ultraviolet region, a cold cathode tube and a hot cathode tube, an LED, and so forth.

EXAMPLE

Next, the present invention will be specifically described referring to Examples, but the present invention is not limited thereto. Incidentally, "parts" and "%" used in the following Examples represent "parts by weight" and "% by weight", respectively, unless otherwise mentioned.

<<Preparation of Ink for Ink Set>>
[Preparation of Chromatic Ink]
(Preparation of Chromatic Ink 101: Hot-Melt Chromatic Ink)

| | |
|---|---|
| Pigment: C. I. Pigment Blue 15:3 (an average particle diameter of 100 nm) | 5 parts by weight |

| | |
|---|---|
| Paraffin wax (155, produced by Nippon Seiro Co., Ltd.) | 45 parts by weight |
| Behenic acid (produced by Wako Pure Chemical Industries, Ltd.) | 30 parts by weight |
| Oreic acid amide (FATTY AMIDE ON, produced by Kao Corporation) | 20 parts by weight |

After each of the above-described additives was mixed in order, followed by heating at 150° C. while stirring, the resulting solution was filtrated with a filter during heating, followed by cooling to prepare chromatic ink 101.
(Preparation of Chromatic Ink 102: Radical UV Chromatic Ink without Using Gelling Agent)
<Preparation of Cyan Pigment Dispersion>

| | |
|---|---|
| C. I. Pigment Blue 15:3 | 20 parts by weight |
| Polymer dispersant (Solsperse series, produced by Zeneca Limited) | 5 parts by weight |
| Stearyl acrylate | 75 parts by weight |

After mixing each of the above-described additives, the dispersing condition was appropriately adjusted to conduct dispersing with a commonly known dispersing apparatus in such a way that the average particle diameter of pigment particles fell within the range of 0.2 and 0.3 µm, followed by filtration with a filter while heating to prepare cyan pigment dispersion 1.
<Preparation of Chromatic Ink>

| | |
|---|---|
| Cyan pigment dispersion 1 | 20 parts by weight |
| Photo-polymerizable compound 1: Lauryl acrylate (monofunctional) | 5 parts by weight |
| Photo-polymerizable compound 2: Ethylene oxide modified trimethylol propane triacrylate (trifunctional) | 5 parts by weight |
| Photo-polymerizable compound 3: Caprolactam modified dipentaerythritol hexaacrylate (hexafunctional) | 35 parts by weight |
| Photo-polymerizable compound 4: Tetraethylene glycol diacrylate (bifunctional) | 30 parts by weight |
| Polymerization initiator 1: Irgacure 184 (produced by BASF Japan Ltd.) | 2.5 parts by weight |
| Polymerization initiator 2: Irgacure 907 (produced by BASF Japan Ltd.) | 2.5 parts by weight |

Each of the above-described additives was added in order, and mixed, followed by filtrating with a filter having an absolute filtration accuracy of 2 µm to prepare chromatic ink 102.
(Preparation of Chromatic Ink 103: Radical UV Chromatic Ink with Use of Gelling Agent)
<Preparation of Chromatic Ink>

| | |
|---|---|
| The foregoing cyan pigment dispersion 1 | 20 parts by weight |
| Photo-polymerizable compound 1: Lauryl acrylate (monofunctional) | 10 parts by weight |
| Photo-polymerizable compound 2: Ethylene oxide modified trimethylol propane triacrylate (trifunctional) | 10 parts by weight |
| Photo-polymerizable compound 3: Caprolactam modified dipentaerythritol hexaacrylate (hexafunctional) | 20 parts by weight |
| Photo-polymerizable compound 4: Tetraethylene glycol diacrylate (bifunctional) | 25 parts by weight |
| Gelling agent: 12-hydroxy stearic acid (produced by Alfa Aesar) | 10 parts by weight |
| Polymerization initiator 1: Irgacure 184 (produced by BASF Japan Ltd.) | 2.5 parts by weight |
| Polymerization initiator 2: Irgacure 907 (produced by BASF Japan Ltd.) | 2.5 parts by weight |

Each of the above-described additives was added in order, and mixed at 100° C., followed by filtrating with a filter having an absolute filtration accuracy of 2 µm to prepare chromatic ink 103. (Preparation of chromatic ink 104: Radical UV chromatic ink with use of gelling agent)

Chromatic ink 103 was prepared similarly to preparation of the above-described chromatic ink 103, except that 12-hydroxy stearic acid as a gelling agent was replaced by STEARON (produced by Alfer Aesar) as a gelling agent.
(Preparation of Chromatic Ink 105: Cationic UV Ink without Using Gelling Agent)
<Preparation of Cyan Pigment Dispersion 2>

| | |
|---|---|
| C.I. Pigment Blue 15:3 | 20 parts by weight |
| Polymer dispersant PB 822 (produced by Ajinomoto Fine-Techno Co., Inc.) | 8 parts by weight |
| Oxetane compound OXT 221 (produced by Toagosei Co., Ltd.) | 72 parts by weight |

After mixing each of the above-described additives, the dispersing condition was appropriately adjusted to conduct dispersing with a commonly known dispersing apparatus in such a way that the average particle diameter of pigment particles fell within the range of 0.2 and 0.3 µm, followed by filtrating with a filter while heating to prepare cyan pigment dispersion 2.
<Preparation of Chromatic Ink>

| | |
|---|---|
| Cyan pigment dispersion 2 | 20 parts by weight |
| Polymerizable compound 1: Alicyclic epoxy compound CEL 2021P (produced by Daicel Corporation) | 15 parts by weight |
| Polymerizable compound 2: Oxetane compound OXT 221 (produced by Toagosei Co., Ltd.) | 62 parts by weight |
| Propylene carbonate 50% solution of triaryl sulfonium salt CPI-100P (produced by San-Apro Ltd.) | 2 parts by weight |
| Thioxanthone DETX (produced by Nippon Kayaku Co., Ltd.) | 1.0 part by weight |

Each of the above-described additives was added in order, and mixed, followed by filtrating with a filter having an absolute filtration accuracy of 2 µm to prepare chromatic ink 105.
(Preparation of Chromatic Ink 106: Cationic UV Chromatic Ink with Use of Gelling Agent)

| | |
|---|---|
| The foregoing cyan pigment dispersion 2 | 20 parts by weight |
| Polymerizable compound 1: Alicyclic epoxy compound CEL 2021P (produced by Daicel Corporation) | 15 parts by weight |
| Polymerizable compound 2: Oxetane compound OXT 221 (produced by Toagosei Co., Ltd.) | 51.5 parts by weight |
| Gelling agent: STEARON (produced by Alfa Aesar) | 10 parts by weight |
| Photo-polymerization initiator 1: Iodonium salt IBPF (produced by Sanwa Chemical Co., Ltd.) | 2.5 parts by weight |
| Thioxanthone DETX (produced by Nippon Kayaku Co., Ltd.) | 1.0 part by weight |

Each of the above-described additives was added in order, and mixed, followed by filtrating with a filter having an absolute filtration accuracy of 2 μm to prepare chromatic ink 106. (Preparation of chromatic ink 107: Cationic UV chromatic ink with use of gelling agent)

Chromatic ink 107 was prepared similarly to preparation of the above-described ink 106, except that STEARON as a gelling agent was replaced by dibutyl ethylhexanoyl glutamide EB-21(produced by Ajinomoto Co., Inc.) as a gelling agent.
(Preparation of Chromatic Ink 108: Cationic UV Chromatic Ink without Using Gelling Agent)
<Preparation of Cyan Pigment Dispersion 3>

| | |
|---|---|
| C. I. Pigment Blue 15:3 | 20 parts by weight |
| Polymer dispersant PB 822 (produced by Ajinomoto Fine-Techno Co., Inc.) | 8 parts by weight |
| Cyclohexane divinyl ether CHDVE (produced by Nippon Carbide Industries Co., Inc.) | 72 parts by weight |

PB 822 and CHDVE were added in order, and mixed at 100° C. Thereafter, the resulting solution was cooled to room temperature, and 20 parts by weight of the above-described pigment was added into this solution. After the resulting solution together with 200 parts by weight of zirconia beads each having a diameter of 0.5 mm was charged in a glass bottle, followed by conducting a dispersing treatment for 10 hours employing a paint shaker, zirconia beads were removed therefrom to prepare cyan pigment dispersion 3.
<Preparation of Chromatic Ink>

| | |
|---|---|
| Cyan pigment dispersion 3 | 20 parts by weight |
| Cyclohexane divinyl ether CHDVE (produced by Nippon Carbide Industries Co., Inc.) | 58 parts by weight |
| Vinyl ether oligomer Vectomer 2020 (produced by Aldrich) | 20 parts by weight |
| 2,2,6,6-tetramethyl piperidine 1-oxyl (TEMPO) | 0.03 parts by weight |
| Propylene carbonate 50% solution of triaryl sulfonium salt CPI-100P (produced by San-Apro Ltd.) | 2 parts by weight |

Each of the above-described additives was added in order, and mixed, followed by filtrating with a filter having an absolute filtration accuracy of 2 μm to prepare chromatic ink 108.
(Preparation of Chromatic Ink 109: Cationic UV Chromatic Ink with Use of Gelling Agent)
<Preparation of Chromatic Ink>

| | |
|---|---|
| The foregoing cyan pigment dispersion 3 | 20 parts by weight |
| Cyclohexane divinyl ether CHDVE (produced by Nippon Carbide Industries Co., Inc.) | 53 parts by weight |
| Vinyl ether oligomer Vectomer 2020 (produced by Aldrich) | 20 parts by weight |
| Gelling agent: CROTHIX OG-CS (produced by Croda Inc.) | 5 parts by weight |
| 2,2,6,6-tetramethyl piperidine 1-oxyl (TEMPO) | 0.03 parts by weight |
| Propylene carbonate 50% solution of triaryl sulfonium salt CPI-100P (produced by San-Apro Ltd.) | 2 parts by weight |

Each of the above-described additives was added in order, and mixed at 120° C., followed by filtrating with a filter having an absolute filtration accuracy of 2 μm to prepare chromatic ink 109.

(Preparation of Chromatic Ink 110: Cationic UV Chromatic Ink with Use of Gelling Agent)

Chromatic ink 110 was prepared similarly to preparation of the above-described chromatic ink 109, except that CROTHIX OG-CS as a gelling agent was replaced by stearoyl inulin Rheopearl ISK2 (produced by Chiba Flour Milling Co., Ltd.) as a gelling agent.
<Preparation of Colorless Ink>
(Preparation of Colorless Ink 201: Radical UV Colorless Ink without Using Gelling Agent)

| | |
|---|---|
| Photo-polymerizable compound 1: Lauryl acrylate (monofunctional) | 25 parts by weight |
| Photo-polymerizable compound 2: Ethylene oxide modified trimethylol propane triacrylate (trifunctional) | 5 parts by weight |
| Photo-polymerizable compound 3: Caprolactam modified dipentaerythritol hexaacrylate (hexafunctional) | 35 parts by weight |
| Photo-polymerizable compound 4: Tetraethylene glycol diacrylate (bifunctional) | 30 parts by weight |
| Polymerization initiator 1: Irgacure 184 (produced by BASF Japan Ltd.) | 2.5 parts by weight |
| Polymerization initiator 2: Irgacure 907 (produced by BASF Japan Ltd.) | 2.5 parts by weight |

Each of the above-described additives was added in order, and mixed, followed by filtrating with a filter having an absolute filtration accuracy of 2 μm to prepare achromatic ink 201.
(Preparation of Colorless Ink 202: Radical UV Colorless Ink with Use of Gelling Agent)

| | |
|---|---|
| Photo-polymerizable compound 1: Lauryl acrylate (monofunctional) | 25 parts by weight |
| Photo-polymerizable compound 2: Ethylene oxide modified trimethylol propane triacrylate (trifunctional) | 5 parts by weight |
| Photo-polymerizable compound 3: Caprolactam modified dipentaerythritol hexaacrylate (hexafunctional) | 25 parts by weight |
| Photo-polymerizable compound 4: Tetraethylene glycol diacrylate (bifunctional) | 30 parts by weight |
| Gelling agent: 12-hydroxy stearic acid (produced by Alfa Aesar) | 10 parts by weight |
| Polymerization initiator 1: Irgacure 184 (produced by BASF Japan Ltd.) | 2.5 parts by weight |
| Polymerization initiator 2: Irgacure 907 (produced by BASF Japan Ltd.) | 2.5 parts by weight |

Each of the above-described additives was added in order, and mixed, followed by filtrating with a filter having an absolute filtration accuracy of 2 μm to prepare achromatic ink 202.
(Preparation of Colorless Ink 203: Radical UV Colorless Ink with Use of Gelling Agent)

Colorless ink 203 was prepared similarly to preparation of the above-described colorless ink 202, except that 12-hydroxy stearic acid as a gelling agent was replaced by STEARON (produced by Alfer Aesar) as a gelling agent.
(Preparation of Colorless Ink 204: Cationic UV Colorless Ink without Using Gelling Agent)

| | |
|---|---|
| Polymerizable compound 1: Alicyclic epoxy compound CEL 2021P (produced by Daicel Corporation) | 25 parts by weight |
| Polymerizable compound 2: Oxetane OXT 221 (produced by Toagosei Co., Ltd.) | 72 parts by weight |

| Propylene carbonate 50% solution of triaryl sulfonium salt CPI-100P (produced by San-Apro Ltd.) | 2 parts by weight |
| --- | --- |
| Thioxanthone DETX (produced by Nippon Kayaku Co., Ltd.) | 1.0 part by weight |

Each of the above-described additives was added in order, and mixed, followed by filtrating with a filter having an absolute filtration accuracy of 2 μm to prepare colorless ink 204.

(Preparation of Colorless Ink 205: Cationic UV Colorless Ink with Use of Gelling Agent)

| Polymerizable compound 1: Alicyclic epoxy compound CEL 2021P (produced by Daicel Corporation) | 25 parts by weight |
| --- | --- |
| Polymerizable compound 2: Oxetane compound OXT 221 (produced by Toagosei Co., Ltd.) | 61.5 parts by weight |
| Gelling agent: STEARON (produced by Alfa Aesar) | 10 parts by weight |
| Photo-polymerization initiator 1: Iodonium salt IBPF (produced by Sanwa Chemical Co., Ltd.) | 2.5 parts by weight |
| Thioxanthone DETX (produced by Nippon Kayaku Co., Ltd.) | 1.0 part by weight |

Each of the above-described additives was added in order, and mixed, followed by filtrating with a filter having an absolute filtration accuracy of 2 μm to prepare colorless ink 205.

(Preparation of Colorless Ink 206: Cationic UV Colorless Ink with Use of Gelling Agent)

Colorless ink 206 was prepared similarly to preparation of the above-described colorless ink 205, except that STEARON as a gelling agent was replaced by dibutyl ethylhexanoyl glutamide EB-21(produced by Ajinomoto Co., Inc.) as a gelling agent.

(Preparation of Colorless Ink 207: Cationic UV Colorless Ink without Using Gelling Agent)

| Cyclohexane divinyl ether CHDVE (produced by Nippon Carbide Industries Co., Inc.) | 78 parts by weight |
| --- | --- |
| Vinyl ether oligomer Vectomer 2020 (produced by Aldrich) | 20 parts by weight |
| 2,2,6,6-tetramethyl piperidine 1-oxyl (TEMPO) | 0.03 parts by weight |
| Propylene carbonate 50% solution of triaryl sulfonium salt CPI-100P (produced by San-Apro Ltd.) | 2 parts by weight |

Each of the above-described additives was added in order, and mixed, followed by filtrating with a filter having an absolute filtration accuracy of 2 μm to prepare colorless ink 207.

(Preparation of Colorless Ink 208: Cationic UV Colorless Ink with Use of Gelling Agent)

| Cyclohexane divinyl ether CHDVE (produced by Nippon Carbide Industries Co., Inc.) | 73 parts by weight |
| --- | --- |
| Vinyl ether oligomer Vectomer 2020 (produced by Aldrich) | 20 parts by weight |
| Gelling agent: CROTHIX OG-CS (produced by Croda Inc.) | 5 parts by weight |
| 2,2,6,6-tetramethyl piperidine 1-oxyl (TEMPO) | 0.03 parts by weight |
| Propylene carbonate 50% solution of triaryl sulfonium salt CPI-100P (produced by San-Apro Ltd.) | 2 parts by weight |

Each of the above-described additives was added in order, and mixed at 120° C., followed by filtrating with a filter having an absolute filtration accuracy of 2 μm to prepare colorless ink 208.

(Preparation of Colorless Ink 209: Cationic UV Colorless Ink with Use of Gelling Agent)

Colorless ink 209 was prepared similarly to preparation of the above-described colorless ink 208, except that CROTHIX OG-CS as a gelling agent was replaced by stearoyl inulin Rheopearl ISK2 (produced by Chiba Flour Milling Co., Ltd.) as a gelling agent.

As to the resulting chromatic ink 101 to chromatic ink 110 described above, kinds of ink and melting temperature of the added gelling agent (temperature at which a gelling agent which has gelated starts to be melted) are collectively shown in Table 1. In addition, as to melting temperature of the gelling agent, a test specimen of each gelling agent in the form of gel was placed in a melting point measuring device ATM-01 (manufactured by AS ONE Corporation), and heated at a temperature-rising rate of 5° C./min or less to measure temperature at which the test specimen was melted. The foregoing operation was repeated 3 times to determine a mean value, and the value obtained by rounding the mean value to the closest whole number was set to melting temperature of the gelling agent.

TABLE 1

| Chromatic ink No. | Kinds of ink | Kinds of gelling agents | Melting temperature (° C.) |
| --- | --- | --- | --- |
| 101 | Hot-melt ink | — | — |
| 102 | Radical UV ink | — | — |
| 103 | Radical UV ink | 12-hydroxy stearic acid | 60 |
| 104 | Radical UV ink | Stearone | 65 |
| 105 | Cationic UV ink | — | — |
| 106 | Cationic UV ink | Stearone | 65 |
| 107 | Cationic UV ink | EB-21 | 80 |
| 108 | Cationic UV ink | — | — |
| 109 | Cationic UV ink | OG-CS | 120 |
| 110 | Cationic UV ink | Inulin stearate | 43 |

Similarly, as to the resulting colorless ink 201 to colorless ink 209 described above, kinds of ink and melting temperature of the added gelling agent (temperature at which a gelling agent which has gelated starts to be melted) are collectively shown in Table 2. In addition, gelling agents each are the same gelling agent as described in Table 1, and the melting temperature measured above was described.

TABLE 2

| Colorless ink No. | Kinds of ink | Kinds of gelling agents | Melting temperature (° C.) |
| --- | --- | --- | --- |
| 201 | Radical UV ink | — | — |
| 202 | Radical UV ink | 12-hydroxy stearic acid | 60 |
| 203 | Radical UV ink | Stearone | 65 |
| 204 | Cationic UV ink | — | — |
| 205 | Cationic UV ink | Stearone | 65 |

TABLE 2-continued

| Colorless ink No. | Kinds of ink | Kinds of gelling agents | Melting temperature (° C.) |
|---|---|---|---|
| 206 | Cationic UV ink | EB-21 | 80 |
| 207 | Cationic UV ink | — | — |
| 208 | Cationic UV ink | OG-CS | 120 |
| 209 | Cationic UV ink | Inulin stearate | 43 |

[Preparation of Ink Set]

As to each chromatic ink and each colorless ink prepared above, each of ink set 1 to ink set 31 was prepared with combinations described in Table 3. In addition, ink set No. was appropriately provided even in the case of chromatic ink used singly.

ink, and as described in Table 4, a method of providing colorless ink by which the colorless ink was evenly provided regardless of a coating amount of chromatic ink, and another method of providing colorless ink by which it was reversely imagewise-applied to a coating amount of chromatic ink to be provided were separately used to conduct printing.

In addition, an ink supply system is composed of an ink tank, a supply pipe, a front room ink tank immediately before the head, a piping equipped with a filter, and a recording head, and the region up to the recording head from the front room tank was heat-insulated, and heated to 120° C. The recording head was driven in such a way that multi-size dots each of 4 pl were ejected at a resolution of 1440×1440 dpi to continuously eject it with ink. When preparing samples 15, 17, 23 and 25, the chromatic ink employed 4 pl, and the colorless ink employed 14 pl for

TABLE 3

Ink set configuration

| Ink set No. | Chromatic ink No. | Colorless ink No. | Actinic energy radiation polymerizable compound | Presence/absence of gelling agent Chromatic ink | Presence/absence of gelling agent Colorless ink | Ink property to be compared with Gelation to be compared with | Ink property to be compared with Dot size to be compared with | Remarks |
|---|---|---|---|---|---|---|---|---|
| 1 | 101 | — | — | Absence | — | — | — | Comparative example |
| 2 | 102 | — | Radical polymerizable | Absence | — | — | — | Comparative example |
| 3 | 105 | — | Cationic polymerizable | Absence | — | — | — | Comparative example |
| 4 | 108 | — | Cationic polymerizable | Absence | — | — | — | Comparative example |
| 5 | 103 | — | Radical polymerizable | Presence | — | — | — | Comparative example |
| 6 | 106 | — | Cationic polymerizable | Presence | — | — | — | Comparative example |
| 7 | 110 | — | Cationic polymerizable | Presence | — | — | — | Comparative example |
| 8 | 103 | 201 | Radical polymerizable | Presence | Absence | — | — | Comparative example |
| 9 | 106 | 204 | Cationic polymerizable | Presence | Absence | — | — | Comparative example |
| 10 | 106 | 207 | Cationic polymerizable | Presence | Absence | — | — | Comparative example |
| 11 | 102 | 203 | Radical polymerizable | Absence | Presence | — | — | Comparative example |
| 12 | 105 | 205 | Cationic polymerizable | Absence | Presence | — | — | Comparative example |
| 13 | 108 | 209 | Cationic polymerizable | Absence | Presence | — | — | Comparative example |
| 14 | 103 | 202 | Radical polymerizable | Presence | Presence | (a) | (c) | Present invention |
| 15 | 107 | 206 | Cationic polymerizable | Presence | Presence | (a) | (c) | Present invention |
| 16 | 109 | 208 | Cationic polymerizable | Presence | Presence | (a) | (c) | Present invention |
| 17 | 104 | 203 | Radical polymerizable | Presence | Presence | (a) | (c) | Present invention |
| 18 | 106 | 205 | Cationic polymerizable | Presence | Presence | (a) | (c) | Present invention |
| 19 | 110 | 209 | Cationic polymerizable | Presence | Presence | (a) | (c) | Present invention |
| 20 | 104 | 202 | Radical polymerizable | Presence | Presence | (b) | (c) | Present invention |
| 21 | 106 | 205 | Cationic polymerizable | Presence | Presence | (a) | (d) | Present invention |
| 22 | 107 | 205 | Cationic polymerizable | Presence | Presence | (b) | (c) | Present invention |
| 23 | 110 | 209 | Cationic polymerizable | Presence | Presence | (a) | (d) | Present invention |
| 24 | 104 | 203 | Radical polymerizable | Presence | Presence | (a) | (c) | Present invention |
| 25 | 103 | 202 | Radical polymerizable | Presence | Presence | (a) | (c) | Present invention |
| 26 | 106 | 205 | Cationic polymerizable | Presence | Presence | (a) | (c) | Present invention |
| 27 | 107 | 206 | Cationic polymerizable | Presence | Presence | (a) | (c) | Present invention |
| 28 | 109 | 209 | Cationic polymerizable | Presence | Presence | (b) | (c) | Present invention |
| 29 | 110 | 209 | Cationic polymerizable | Presence | Presence | (a) | (d) | Present invention |
| 30 | 104 | 202 | Radical polymerizable | Presence | Presence | (b) | (c) | Present invention |
| 31 | 109 | 208 | Cationic polymerizable | Presence | Presence | (a) | (d) | Present invention |

(a): The gelation temperature of chromatic ink is equal to that of colorless ink.
(b): The gelation temperature of chromatic ink is higher than that of colorless ink
(c): The dot size of chromatic ink is equal to that of colorless ink.
(d): The dot size of chromatic ink is smaller than that of colorless ink.

<<Ink-jet Image Formation>>

Each chromatic ink and each colorless ink having been prepared as described above were provided in a line head system ink-jet recording apparatus equipped with a piezo type head employing plain paper sheets each as a substrate for offset resistance and also employing art paper sheets each TOKUHISHI ART Double-sided N (produced by Mitsubishi Paper Mills, Ltd.) as a substrate for evaluation items other than the offset resistance to print solid black wedge-like images. In addition, colorless ink was placed on the downstream side with respect to a group of heads for chromatic liquid droplet size of an ink-jet head to be used. In addition, "dpi" described in the present invention represents the number of dots per 2.54 cm (1 inch).

After ink was deposited thereon, the resulting was exposed to UV radiation at an energy density of 140 W/cm and an illuminance of 20 mJ/cm$^2$ (integrated amount of light), employing a high-pressure mercury lamp VZero 085 (manufactured by INTEGRATION TECHNOLOGY, Inc.) to cure the ink.

Further, a heat treatment together with a pressure application treatment was carried out employing an apparatus equipped with a pair of those for the heating treatment and the pressure application with respect to the belt, as shown in FIG. 1. As to the surface temperature of the heated belt in this case, a treatment thereof was carried out at a temperature, 10° C. higher than a temperature at which a gelling agent to be used was solidified. In addition, the conveyance speed was set to 20 mm/sec. Further, the heat treatment together with the pressure application treatment was conducted with timing prior to exposure to actinic energy radiation in order to produce the effect.

<<Evaluation of Ink>>

As to each of ink sets having been prepared as described above, photographic printing samples prepared in accordance with the above-described method were evaluated.

[Evaluation of Print-through Resistance]

Plain paper sheets were employed as substrates, and the back surface of each substrate having been photographically printed was visually observed to evaluate print-through resistance in accordance with the following evaluation criteria.

A: Neither ooze nor print-through of ink to the back surface is observed.

B: Generation of ooze and print-through of ink is slightly observed, but at a practically available quality level.

C: Ooze and print-through of ink to the back surface are observed, and at a practically unavailable quality level.

D: Generation of ooze and print-through of ink to the back surface is clearly observed.

[Paper-feeding Suitability]

After continuously outputting 50 images on each substrate (a plain paper sheet and an art paper sheet), observation for each of presence or absence of stop caused by occurrence of jamming, adhesion of foreign matter onto the conveyance roller, and film-peeling of a formed image was made to evaluate paper-feeding suitability in accordance with the following criteria.

A: No Jamming occurs even though continuous outputting is carried out, and neither adhesion of foreign matter to a conveyance roller nor film-peeling of a formed image is generated at all.

B: No Jamming occurs even though continuous outputting is carried out, and neither adhesion of foreign matter to a conveyance roller nor film-peeling of a formed image is observed, but this leads to a practically available level though generation of slight film-peeling is observed in a very small part of the formed image.

C: When continuous outputting is carried out, it is observed that jamming or adhesion of foreign matter to a conveyance roller occurs once, or slight film-peeling is observed in apart of the formed image, leading to a practically problematic quality level.

D: Jamming occurs a couple of times during continuous outputting, and further, jamming and adhesion of foreign matter to a conveyance roller are observed, leading to a practically unbearable quality level.

[Evaluation of Offset Resistance]

One hundred prints were produced by the above-described method, and 100 prints were superposed in such a way that a printed surface was brought into contact with the back surface to which the printed surface lay next to be left standing under the environment of 40° C. and 80% RH. Thereafter, the superposed prints were removed from the environment described above, turning over the printed paper sheet page by page, and the number of occurrence of the front surface having been attached onto the back surface in this case was counted to evaluate offset resistance in accordance with the following criteria.

A: No occurrence of the front surface having been attached onto the back surface is observed at all.

B: The number of occurrence of the front surface having been attached onto the back surface is one paper sheet, and this level is negligible.

C: The number of occurrence of the front surface having been attached onto the back surface is 1-4 paper sheets, leading to a practical unavailable quality level.

D: The number of occurrence of the front surface having been attached onto the back surface is at least 5 paper sheets, leading to a practically unbearable quality level.

[Evaluation of Gloss Evenness]

Images each in which printing density was continuously varied in the form of a wedge, and gloss evenness thereof was visually observed to evaluate the gloss evenness in accordance with the following criteria.

A: gloss evenness is realized over the entire density region.

B: Gloss unevenness is slightly observed in a part of the density region, but at a practically available quality level.

C: Generation of gloss unevenness caused by density is observed, and at a practically problematic quality level.

D: Gloss unevenness is largely generated over the entire density region, and at a practically unbearable quality level.

[Evaluation of Wear Resistance]

After printing a solid image on an art paper sheet, the scratching intensity was measured employing a scratching intensity tester HEIDON-18 (manufactured by HEIDON) equipped with a 0.8 mmR sapphire stylus. For the measurement, 10 cm scratching test was carried out 3 times under the condition of constant load, and the load immediately before the substrate started to be scratched was specified as "scratching intensity" to evaluate wear resistance via the measured values in accordance with the following criteria.

A: A scratching intensity of 200 g or more

B: A scratching intensity of at least 150 g and less than 200 g

C: A scratching intensity of at least 100 g and less than 150 g

D: A scratching intensity of less than 100 g

Each of evaluated results obtained from those described above are shown in Table 4.

TABLE 4

| | | Treatment before curing | | | Each of evaluated results | | | | | |
|---|---|---|---|---|---|---|---|---|---|---|
| Sample No. | Ink set No. | Method of providing colorless ink | Heat treatment | Pressure-application treatment | Print-through resistance | Paper-feeding suitability | Offset resistance | Gloss evenness | Wear resistance | Remarks |
| 1 | 1 | — | — | — | B | D | D | D | D | Comp. |
| 2 | 2 | — | — | — | D | C | C | C | D | Comp. |
| 3 | 3 | — | — | — | C | C | D | C | C | Comp. |

TABLE 4-continued

| Sample No. | Ink set No. | Method of providing colorless ink | Heat treatment | Pressure-application treatment | Print-through resistance | Paper-feeding suitability | Offset resistance | Gloss evenness | Wear resistance | Remarks |
|---|---|---|---|---|---|---|---|---|---|---|
| 4 | 4 | — | — | — | C | C | D | C | C | Comp. |
| 5 | 5 | — | — | — | C | C | C | D | C | Comp. |
| 6 | 6 | — | — | — | B | C | C | D | D | Comp. |
| 7 | 7 | — | — | — | B | C | C | D | D | Comp. |
| 8 | 8 | *1 | — | — | C | D | D | C | D | Comp. |
| 9 | 9 | *1 | — | — | C | D | D | C | D | Comp. |
| 10 | 10 | *1 | — | — | C | D | D | C | D | Comp. |
| 11 | 11 | *2 | — | — | D | C | C | C | D | Comp. |
| 12 | 12 | *2 | — | — | D | C | C | C | D | Comp. |
| 13 | 13 | *2 | — | — | D | C | C | C | D | Comp. |
| 14 | 14 | *1 | — | — | B | B | B | B | B | Inv. |
| 15 | 15 | *1 | — | — | B | B | B | B | B | Inv. |
| 16 | 16 | *1 | — | — | B | B | B | B | B | Inv. |
| 17 | 17 | *2 | — | — | B | A | B | B | B | Inv. |
| 18 | 18 | *2 | — | — | B | A | B | A | B | Inv. |
| 19 | 19 | *2 | — | — | B | A | B | A | B | Inv. |
| 20 | 20 | *1 | — | — | A | A | B | A | A | Inv. |
| 21 | 21 | *1 | — | — | B | A | B | A | A | Inv. |
| 22 | 22 | *2 | — | — | A | B | A | B | B | Inv. |
| 23 | 23 | *2 | — | — | B | B | A | B | B | Inv. |
| 24 | 24 | *1 | — | Conducted | B | A | B | B | A | Inv. |
| 25 | 25 | *1 | Conducted | Conducted | B | A | B | A | A | Inv. |
| 26 | 26 | *2 | Conducted | — | B | A | B | A | B | Inv. |
| 27 | 27 | *2 | Conducted | Conducted | B | A | A | A | B | Inv. |
| 28 | 28 | *1 | Conducted | Conducted | A | A | A | A | A | Inv. |
| 29 | 29 | *1 | Conducted | Conducted | B | A | A | A | A | Inv. |
| 30 | 30 | *2 | Conducted | Conducted | A | B | A | A | B | Inv. |
| 31 | 31 | *2 | Conducted | Conducted | B | A | A | B | B | Inv. |

*1: Evenly providing method,
*2: Reversely imagewise-applying method,
Comp.: Comparative example,
Inv.: Present invention As is clear from results described in table 4, it is to be understood that as to sample 1 prepared by using hot-melt ink, each property except for offset resistance is poor in performance. It is because ink penetrated into a paper sheet is not seen, since the hot-melt ink is solidified because of rapid temperature-fall of ink droplets after deposition of the hot-melt ink. In contrast, offset resistance of each of samples 2-4 prepared by using actinic energy radiation curable ink is inferior to that of sample 1. It presumably appears that it is because ink itself exhibits smaller thickening action caused by temperature-fall than that of the hot-melt ink, and is penetrated into paper-fiber after deposition of the ink. In addition to this, each property except for offset resistance is slightly improved in performance in comparison to sample 1, but is overall at an insufficient level.

In contrast, it is seen that samples 5-7 prepared by using ink obtained by providing a gelling agent in actinic energy radiation curable ink are somewhat improved in comparison to samples 2-4 in view of print-through resistance, paper-feeding suitability and offset resistance. It is presumably because thekening after deposition of ink is to be rapidly produced by providing a gelling agent, and film-strength is improved by curing a photo-polymerizable monomer by exposing it to light to improve adhesion to a paper substrate in connection with this. However, it is to be understood that as to these samples, the insufficient effect has been produced.

In contrast, it is to be understood that samples 8-10 prepared by evenly providing colorless ink in the image region are improved in view of paper-feeding suitability, offset resistance, gloss evenness and wear resistance in addition to print-through resistance producing an improved effect as described above. It presumably appears that the print-through resistance, the wear resistance and so forth protect the image surface by providing colorless ink, and the difference in gloss between the printing section and the non-printing section is designed to be minimized to improve these properties.

Further, it is to be understood that samples 11-13 prepared by reversely imagewise-applying this colorless ink are further improved in view of paper-feeding suitability and gloss evenness. It is because difference in height caused by difference in ink coating quantity inside the region of the resulting image is eliminated by reversely imagewise-applying colorless ink, so that paper conveyance after printing becomes smooth, and it can be assumed that visual gloss evenness has been improved. These effects can be confirmed even in any ink having a different kind of photo-curable monomer.

From results of samples 25-31 having been additionally subjected to a heat treatment or a pressure-application treatment conducted before exposing chromatic ink and colorless ink to light, after providing the chromatic ink and the colorless ink, offset resistance is improved in cases where only heating is carried out, or heating and pressure-application are used in combination. Further, it presumably appears that when heating and pressure-application are used in combination, the image surface is more smoothly flattened, resulting in appearance of even images, and since scratches are difficult to be produced by uniformly protecting the surface, adhesion to the substrate is improved, resulting in higher improved performance.

It was confirmed that the same results as shown in Table 3 were obtained even though using multicolor.

In contrast, as to melting temperature of a gelling agent contained in ink, samples 14 and 16 each having the melting temperature of chromatic ink higher than that of colorless ink exhibit good properties of print-through resistance, paper-feeding suitability, wear resistance and so fort, but exhibit equivalent properties, or slightly inferior properties to samples 25-31 described above. It is because the deposited dots are not sufficiently flattened smoothly also in cases where colorless ink is provided on the image surface, since heating has not been conducted, resulting in appearance of results in which balance in performance among print-through resistance, paper-feeding suitability, offset resistance, gloss evenness and wear resistance is slightly poor.

EXPLANATION OF NUMERALS 1 and 1a Recording medium
2 Conveyance means for recording medium
21 A pair of rollers
3 Recording head
34 Supporting section for recording medium
4 Means for heating and pressure-application
41 Heat roller
42 Pressure roller
43 Heat generator
5 Temperature sensor
6 Means of cutting recording medium
61 and 62 Cutter
7 Means for loosening formation
71 A pair of the first rollers
72 A pair of the second rollers

The invention claimed is:
1. An ink-jet ink set comprising:
  (1) chromatic ink containing an actinic energy radiation curable composition, a gelling agent with which a thermoreversible gel is formed, and a colorant; and
  (2) colorless ink containing no colorant but an actinic energy radiation curable composition and a gelling agent with which the thermoreversible gel is formed,
  wherein a gelation temperature of the chromatic ink is higher than that of a gelation temperature of the colorless ink.
2. The ink-jet ink set of claim 1,
  wherein the actinic energy radiation curable composition contained by each of the chromatic ink and the colorless ink comprises a radically polymerizable compound.
3. The ink-jet ink set of claim 1,
  wherein the actinic energy radiation curable composition contained by each of the chromatic ink and the colorless ink comprises a cationically polymerizable compound.
4. An ink-jet image forming method employing the ink-jet ink set of claim 1, comprising the steps of:
  providing the chromatic ink on a substrate;
  subsequently providing the colorless ink on the substrate and/or the chromatic ink, followed by heating applied thereto; and
  subsequently exposing the resulting comprising the chromatic ink and the colorless ink to actinic energy radiation.
5. The ink-jet image forming method of claim 4, wherein a temperature of the heating is 50-200° C.
6. The ink-jet image forming method of claim 4, wherein the colorless ink is provided by evenly or reversely image-wise on the substrate.
7. The ink-jet image forming method of claim 4, wherein the colorless ink when the ink is heated at a temperature of at least 10° C. higher than a melting temperature of the gelling agent.
8. The ink-jet image forming method of claim 4, wherein the temperature of the heating is 50-200° C.
9. The ink-jet ink set of claim 1, wherein the gelling agent of the chromatic ink and/or the gelling agent of the chromatic ink is not radiation curable.
10. The ink-jet ink set of claim 1, wherein the at least one non-radiation curable gelling agent is selected from the group consisting of: polyethylene wax, polypropylene wax, polystyrene wax, stearone, stearic acid, glycerin monastearate, glycerin monolaurate, glycerin mono12-hydroxystearate, an octadocosanoic acid, monoglyceride, stearyl stearate, stearyl alcohol, a behenic acid, lipophilic smectite, a rosin-based oil gelling agent, behenyl alcohol, glyceryl behenate, inulin stearate, dextrin palmitate, N, N-methylenebisoctadecanamide, N-stearylstearic acid amide, oleylpalmitic acid amide, dextrin palmitate, N-lauroyl-L-dibutylglutaminamide, N-2ethylhexanoyl-L-dibutylglutaminamide, 1,3:2,4-bis-O-benzylidene-D-glucitol, 1,3:2,4-bis-O-(4-methylbenzylidene)-D-sorbitol, straight-chain alcohol, a straight-chain carboxylic acid, a urethane resin, compounds represented by the following compounds OG-1, OG-2, OG-3, OG-4, OG-5, OG-6, OG-7, OG-8, OG-9, OG-10, OG-11, OG-12, OG-13, OG-14 and OG-15

OG-1
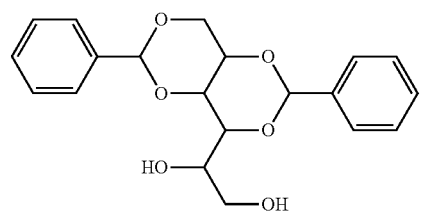

OG-2
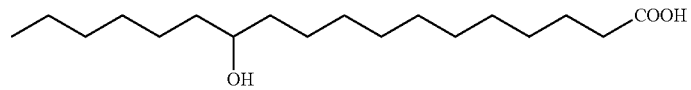

OG-3
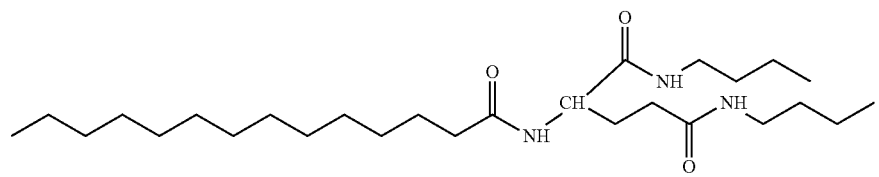

OG-4
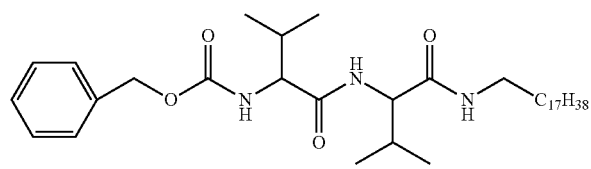
OG-5
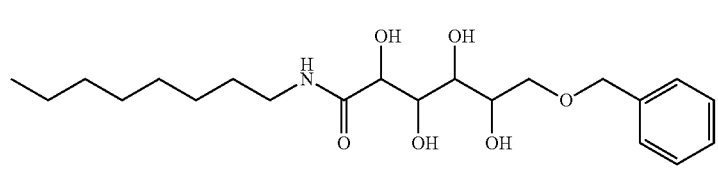
OG-6
F(CF₂)$_n$(CH₂)$_m$H
OG-7
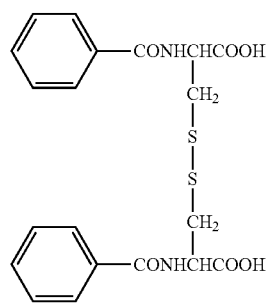
OG-8
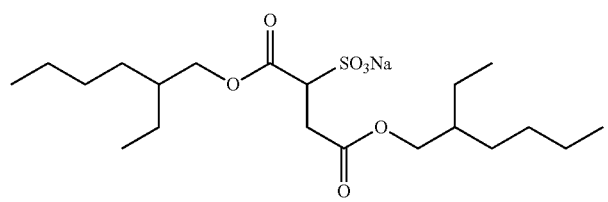
OG-9
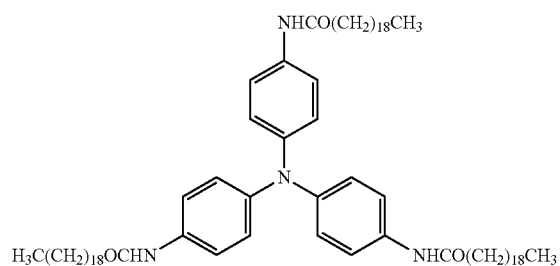
OG-10
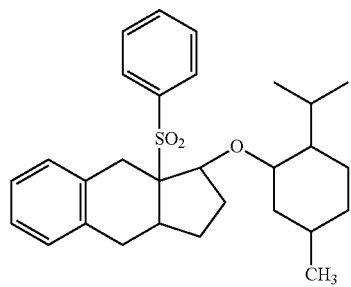
OG-11
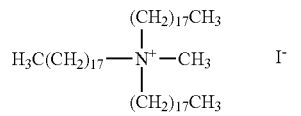

-continued
OG-12
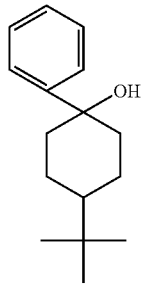
OG-13
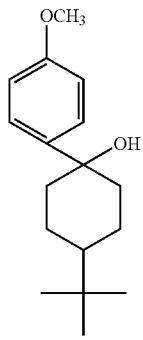
OG-14
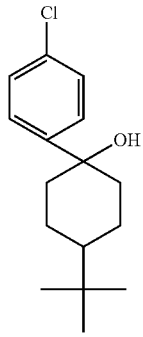
OG-15
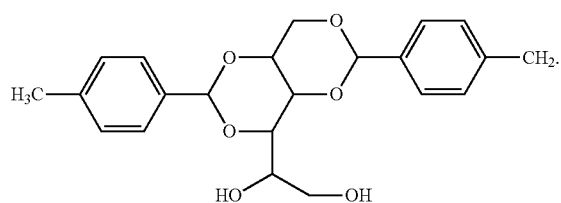
11. The ink-jet image forming method of claim 4, wherein the colorless ink is provided evenly or reversely imagewise on the substrate.
12. The ink-jet ink set of claim 1, wherein the gelling agent contained in the chromatic ink has a higher melting temperature than that of the gelling agent contained in the colorless ink.
* * * * *